(12) United States Patent
Luo et al.

(10) Patent No.: US 12,333,127 B2
(45) Date of Patent: *Jun. 17, 2025

(54) ANALYZING AUGMENTED REALITY CONTENT ITEM USAGE DATA

(71) Applicant: Snap Inc., Santa Monica, CA (US)

(72) Inventors: Jean Luo, Seattle, WA (US); Per Sandell, Los Angeles, CA (US); Vincent Sung, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,382

(22) Filed: Mar. 8, 2024

(65) Prior Publication Data

US 2024/0211119 A1 Jun. 27, 2024

Related U.S. Application Data

(63) Continuation of application No. 18/100,393, filed on Jan. 23, 2023, now Pat. No. 11,934,643, which is a continuation of application No. 17/488,069, filed on Sep. 28, 2021, now Pat. No. 11,579,757.

(60) Provisional application No. 63/085,876, filed on Sep. 30, 2020.

(51) Int. Cl.
*G06F 3/048* (2013.01)
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ...................................................... G06Q 30/02
See application file for complete search history.

(56) References Cited

U.S. PATENT DOCUMENTS 11,579,757 B2  2/2023 Luo et al.
2015/0206349 A1*  7/2015 Rosenthal ............ G06T 19/006
345/633

(Continued)

FOREIGN PATENT DOCUMENTS

CN          116324845 A   6/2023
WO   WO-2022072539 A1   4/2022

OTHER PUBLICATIONS

"U.S. Appl. No. 17/488,069, 312 Amendment filed Dec. 21, 2022", 10 pgs.

(Continued)

*Primary Examiner* — Linh K Pham
(74) *Attorney, Agent, or Firm* — Schwegman Lundberg & Woessner, P.A.

(57) ABSTRACT

Usage metrics for augmented reality content may be identified and analyzed to determine measures of fitness for respective usage metrics. The measures of fitness may indicate a level of correlation with an outcome specified by an augmented reality content creator and an amount of interaction with an augmented reality content item by users of a client application. Recommendations may be provided to augmented reality content creators indicating modifications to augmented reality content items that have at least a threshold probability of increasing the level of interaction between users of the client application and the augmented reality content item.

20 Claims, 9 Drawing Sheets

(56) References Cited

U.S. PATENT DOCUMENTS

| | | | |
|---|---|---|---|
| 2016/0155272 A1* | 6/2016 | Polo | G06F 3/041 |
| | | | 345/633 |
| 2017/0116161 A1 | 4/2017 | Stein et al. | |
| 2017/0372525 A1* | 12/2017 | Rosenthal | H04N 21/4784 |
| 2018/0025372 A1* | 1/2018 | Ahmed | G06Q 30/0253 |
| | | | 705/7.34 |
| 2018/0232921 A1* | 8/2018 | Smith | G06Q 30/0201 |
| 2019/0094966 A1* | 3/2019 | Kulkarni | G06T 19/006 |
| 2019/0238952 A1* | 8/2019 | Boskovich | H04N 21/858 |
| 2019/0278997 A1* | 9/2019 | Yin | G06Q 30/0641 |
| 2019/0310757 A1* | 10/2019 | Lee | H04N 7/157 |
| 2019/0310761 A1* | 10/2019 | Agarawala | G06F 3/04817 |
| 2019/0388647 A1* | 12/2019 | Bender | G06F 3/011 |
| 2020/0035003 A1* | 1/2020 | Canberk | G06T 11/00 |
| 2020/0117336 A1* | 4/2020 | Mani | F25B 49/005 |
| 2020/0285565 A1* | 9/2020 | Jayaraman | G06F 11/3688 |
| 2020/0302510 A1* | 9/2020 | Chachek | G06Q 30/0639 |
| 2021/0004756 A1* | 1/2021 | Kulkarni Wadhonkar | |
| | | | G06V 20/52 |
| 2021/0065448 A1* | 3/2021 | Goodrich | G06F 1/1626 |
| 2021/0374839 A1* | 12/2021 | Luo | G06Q 50/01 |
| 2022/0100336 A1 | 3/2022 | Luo et al. | |
| 2023/0152951 A1 | 5/2023 | Luo et al. | |

OTHER PUBLICATIONS

"U.S. Appl. No. 17/488,069, Notice of Allowance mailed Sep. 21, 2022", 11 pgs.

"U.S. Appl. No. 17/488,069, PTO Response to Rule 312 Communication mailed Jan. 11, 2023", 2 pgs.

"U.S. Appl. No. 18/100,393, Non Final Office Action mailed Jul. 20, 2023", 3 pgs.

"U.S. Appl. No. 18/100,393, Notice of Allowance mailed Nov. 9, 2023", 9 pgs.

"U.S. Appl. No. 18/100,393, Response filed Oct. 20, 2023 to Non Final Office Action mailed Jul. 20, 2023", 10 pgs.

"International Application Serial No. PCT/US2021/052711, International Preliminary Report on Patentability mailed Apr. 13, 2023", 10 pgs.

"International Application Serial No. PCT/US2021/052711, International Search Report mailed Jan. 7, 2022", 4 pgs.

"International Application Serial No. PCT/US2021/052711, Written Opinion mailed Jan. 7, 2022", 8 pgs.

Baysal, et al., "Mining Usage and Development Artifacts", IEEE, (2021), 10 pgs.

Behrisch, et al., "Commercial Visual Analytics Systems-Advances in the Big Data Analytics Field", IEEE, (2019), 21 pgs.

Varsaluoma, et al., "Usage Data Analytics for Human-Machine Interactions with Flexible Manufacturing Systems Opportunities and Challenges", IEEE, (2017), 8 pgs.

* cited by examiner

ANALYZING AUGMENTED REALITY CONTENT ITEM USAGE DATA

CROSS-REFERENCE TO RELATED APPLICATION

This patent application is a continuation of U.S. patent application Ser. No. 18/100,393, filed Jan. 23, 2023, which patent application is a continuation of U.S. patent application Ser. No. 17/488,069, filed Sep. 28, 2021, now issued as U.S. Pat. No. 11,579,757, which application claims the benefit of U.S. Provisional Patent Application No. 63/085,876, filed on Sep. 30, 2020, entitled "ANALYZING AUGMENTED REALITY CONTENT ITEM USAGE DATA," all of which are incorporated by reference herein in their entireties.

BACKGROUND

Applications executed by client devices may be used to generate content. For example, client applications may be used to generate messaging content, image content, video content, audio content, media overlays, documents, creative works, combinations thereof, and the like. In various situations, user content may be modified by augmented reality content.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
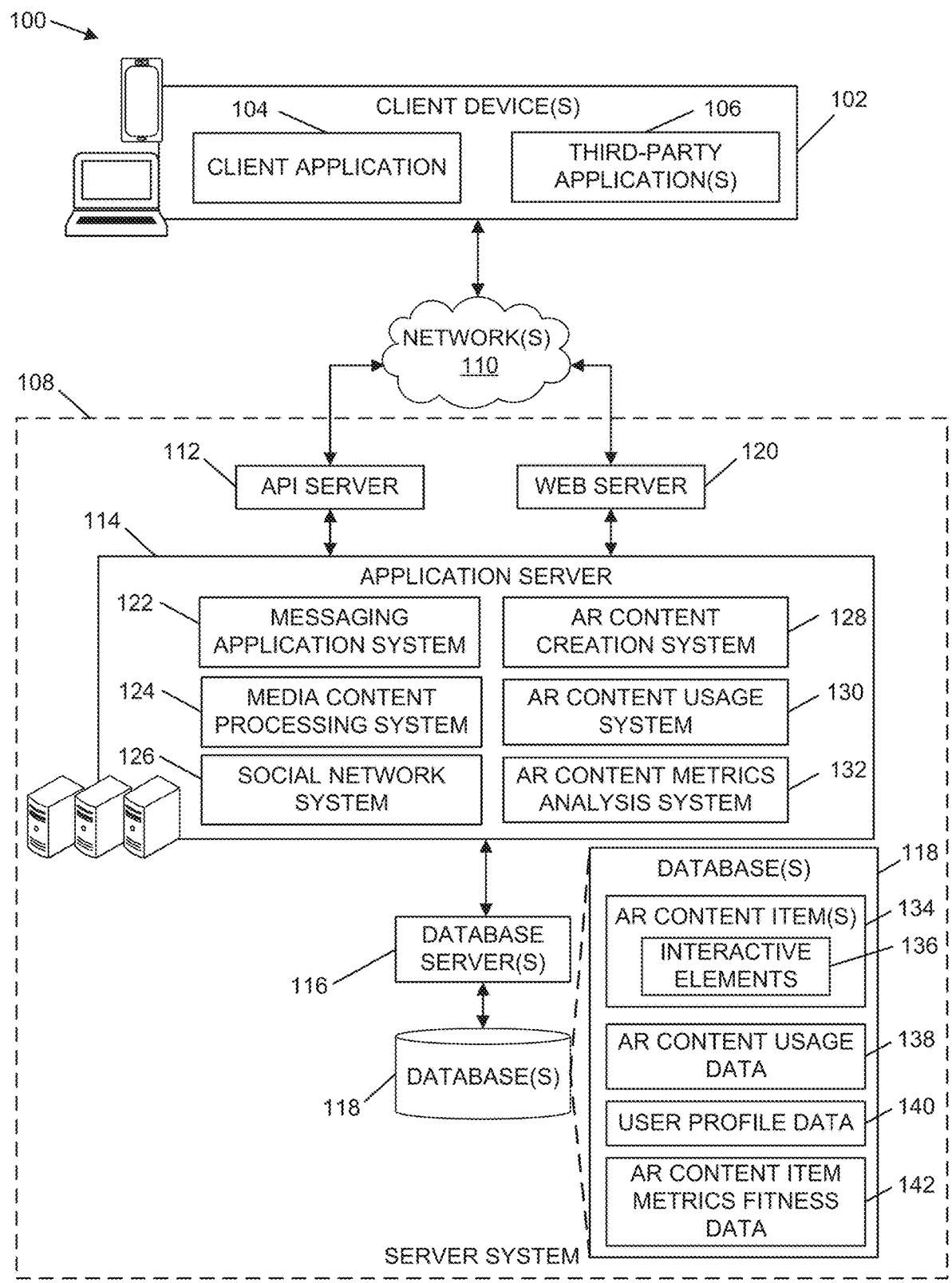
FIG. 1 is a diagrammatic representation of an architecture for exchanging data (e.g., messages and associated content) over a network, according to one or more example implementations.

Individuals and organizations may create augmented reality content items that may be consumed by users of a client application that may execute the augmented reality content items. For example, augmented reality content items may be created that modify an appearance of one or more objects included in user content, where the user content may include at least one of image content, video content, or audio content captured via the client application using one or more input devices of a client device. To illustrate, an augmented reality content item may modify an appearance of one or more individuals included in user content. In one or more examples, the augmented reality content item may modify user content by adding at least one of image content or video content to user content that modifies an appearance of an object included in the user content. In various examples, the augmented reality content item may cause content to be displayed that overlays at least a portion of an object included in the user content. Additionally, the augmented reality content item may modify pixel data of image content or video content to change an appearance of at least one object included in the user content.

In existing systems and methods, the amount of information that augmented reality content creators may obtain about the use of their augmented reality content items is limited. In one or more examples, augmented reality content creators may obtain information indicating an amount of time that users of a client application have viewed the augmented reality content items or a number of times that the augmented reality content items have been shared with additional users of the client application. In addition, augmented reality content creators are, typically, able to obtain limited information about the characteristics of users of the client application that are consuming the augmented reality content items generated by these creators. Existing systems and methods generate augmented reality content items that lack the technical functionality to track the usage of augmented reality content items in ways that provide more robust information to augmented reality content creators about the use of the augmented reality content items they have created. In particular, during the creation of augmented reality content items, existing systems and methods provide limited granularity with respect to the interactions that users have with augmented reality content items. Further, the technical infrastructure used by existing systems and methods limits the availability and the amount of information about characteristics of users that interact with augmented reality content items. Additionally, augmented reality content creators typically are unable to obtain information indicating usage metrics that correlate to outcomes and/or objectives that are desired by the augmented reality content creators, such as a number of purchases of a product corresponding to an augmented reality content item or an amount of time that users of the client application interact with an augmented reality content item.

The implementations of systems, methods, techniques, instruction sequences, and computing machine program products described herein are directed to collecting and analyzing augmented reality content item usage data. The implementations described herein may be used to obtain additional information related to the use of augmented reality content items that is not available with existing systems and methods. For example, implementations described herein may collect profile information of users of a client application that interact with augmented reality content items. Implementations described herein may also analyze the information collected about the client application users. In this way, the systems and methods described herein may provide detailed information to augmented reality content creators about the users that consume the augmented reality content items generated by these creators. In one or more scenarios, augmented reality content creators may tailor their augmented reality content items to an audience of additional client application users based on the characteristics of client application users that have previously interacted with their augmented reality content items. Additionally, augmented reality content creators may implement campaigns to bring awareness of their augmented reality content to additional client application users that share characteristics with client application users that have previously interacted with the augmented reality content items generated by these creators.

In various examples, the systems and methods described herein may enable creators of augmented reality content items to tie a number of specific user interface elements to features of augmented reality content items. For example, creators of augmented reality content may select features of their augmented reality content items for which to track user interactions with the features. To illustrate, an augmented reality content item may include a number of features that client application users may interact with and a creator of the augmented reality content item may indicate one or more of the features to associate with a selectable user interface element. In these situations, user input indicating that at least one of the selectable user interface elements has been chosen may be collected and analyzed. In this way, additional interactions by client application users with augmented reality content items may be tracked that are not able to be captured by existing systems and methods and a greater degree of granularity with respect to interactions with features of augmented reality content items may be tracked in relation to existing systems and methods. In one or more examples, metrics indicating the amount of user interaction with respect to an augmented reality content item or the amount of user interaction with features of the augmented reality content item may be determined based on the data obtained from tracking the selection of user interface elements that correspond to the augmented reality content item.

In various examples, the usage metrics used to characterize an amount of interaction between users of the client application and augmented reality content items may also be evaluated. In one or more examples, some usage metrics may be more indicative of one or more outcomes desired by an augmented reality content creator than other usage metrics. The systems and methods described herein may evaluate usage metrics that are determined with respect to augmented reality content items and identify, for a given augmented reality content item, at least one usage metric that has at least a threshold probability of indicating the desired outcome. In additional examples, the augmented reality content items may be modified in order to increase the usage metrics that having the highest probability of correlating with the outcomes specified by the augmented reality content creators. In one or more implementations, recommendations may be provided to augmented reality content creators indicating features of augmented reality content items that have at least a threshold probability of resulting in outcomes specified by augmented reality content creators.

The systems and methods described herein may also determine profile information of client application users that interact with augmented reality content items. In various examples, implementations described herein may identify interactions by client application users with augmented reality content and store profile information of the client application users in association with the augmented reality content. The systems and methods described herein may then analyze the user profile information to determine a characterization of client application users that interact with the augmented reality content items. The characterization of client application users may indicate characteristics of client application users that interact with the augmented reality content items. In one or more examples, the profile information of client application users that interact with the augmented reality content items may be analyzed to determine a target audience for the augmented reality content items.

Accordingly, the systems, methods, techniques, instruction sequences, and computing machine program products described herein provide various implementations to collect more information about the use of augmented reality content than existing systems and methods by providing an underlying technical architecture that enables the tracking of interactions by client application users with various features of augmented reality content items. The systems and methods described herein also provide additional insights in relation to existing systems and methods for augmented reality content creators with regard to the client application users that interact with the augmented reality content items generated by these creators. In this way, the augmented reality content creators may identify client application users that are more likely to interact with their augmented reality content items than existing systems and methods. In situations where an augmented reality content item is related to one or more products, the augmented reality content creators are more likely to identify client application users that will purchase their products than existing systems and methods.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, an augmented reality (AR) content creation system 128, an AR content usage system 130, and an AR content metrics analysis system 132. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The AR content creation system 128 may be used to generate AR content items 134. Individual AR content items 134 may include computer-readable instructions that are executable to modify user content captured by the client device 102. In various examples, the AR content creation system 128 may provide one or more user interfaces that may be used to create the AR content items 134. To illustrate, the AR content creation system 128 may provide one or more user interfaces to import at least one of image content, video content, or audio content that may be used to generate an AR content item 134. The AR content creation system 128 may also provide one or more user interfaces with one or more creative tools that may be used to create one or more of the AR content items 134. In one or more illustrative examples, the AR content creation system 128 may implement at least one of a drawing tool, a writing tool, a sketching tool, or a coloring tool that may be used to generate the AR content items 134.

The AR content creation system 128 may also enable a creator of an AR content item 134 to provide an indication that interactions by users of the client application 104 with the AR content item 134 are to be monitored or tracked. In one or more examples, the AR content creation system may enable a creator of the AR content item 134 to identify one or more features of the AR content item 134 to be tracked. The features of AR content items 134 that are being tracked may be related to interactive elements 136 of the AR content items 134. The interactive elements 136 may include user interface elements that may receive input. For example, the interactive elements 136 may correspond to a portion of a user interface that may detect input by a user of the client application 104. The input may be detected by using an input device, such as at least one of a cursor, stylus, finger, another implement, or a speaker of a client device 102. The input may be directed to selection of a user interface element, moving the user interface element, or another method of indicating an interaction with an interactive element 136. In this way, input detected by a user interface element corresponding to an interactive element 136 of an AR content item 134 may be collected, stored, such as in the database(s) 118, and analyzed.

In various examples, the interactive elements 136 may be selectable to cause one or more actions to be performed with respect to user content generated by the client application 104. In one or more scenarios, the interactive elements 136 may be selectable to cause one or more visual effects to be displayed in relation to user content. In one or more additional examples, the interactive elements 136 may be selectable to cause video content to be displayed, to cause audio content to be played, to cause animation content to be displayed, to cause text content to be displayed, to cause image content to be displayed, or one or more combinations thereof. In one or more illustrative examples, the AR content creation system 128 may provide one or more user interfaces that enable the selection of one or more interactive elements 136 that are to be tracked.

In various examples, a user interface tool, such as a cursor or pointer, may be used to indicate a feature of an AR content item 134 or a region of an AR content item 134 for which user interactions are to be tracked. Tracking the use of AR content items 134 may comprise at least one of identifying or counting interactions with the AR content items 134 by users of the client application 104. Interactions with an AR content item 134 may include at least one of applying an AR content item 134 to user content, sharing an AR content item 134 with another user of the client application 104, generating a message that includes the AR content item 134 or includes a link corresponding to the AR content item 134, activating an interactive element 136 of the AR content item 134, selecting a user interface element that corresponds to an interactive element 136 of the AR content item 134, unlocking the AR content item 134, purchasing the AR content item 134, or selecting an icon that corresponds to the AR content item 134.

In one or more implementations, the AR content creation system 128 may provide one or more templates that indicate features of AR content items 134 that may be tracked. The AR content creation system 128 may provide one or more templates for specified classifications of AR content items 134. For example, the AR content creation system 128 may provide a template for AR content items 134 that include faces, where the template indicates that one or more facial features included in the AR content item 134 may be tracked. In one or more additional examples, the AR content creation system 128 may provide a template for AR content items 134 that include products that may be purchased via the client application 104. In these scenarios, the AR content creation system 128 may provide a template that indicates one or more features of the product, such as features that enable magnification of a view of the product, features that enable rotation of a view of the product, or features that enable the product to be applied to one or more objects.

The AR content usage system 130 may determine an amount of usage of AR content items 134. The amount of usage of the AR content items 134 may be determined based on an amount of interaction with one or more interactive elements 136 of each AR content item 134. Each interaction by a user of the client application 104 with an interactive element 136 may be counted by the AR content usage system 130 and stored in the database(s) 118. In various examples, the database(s) 118 may include one or more data structures for individual AR content items 134, and the one or more data structures for each AR content item 134 may indicate a number of interactions by users of the client application 104 with one or more of the interactive elements 138. In one or more examples, an AR content item 134 may have multiple interactive elements 136. In these scenarios, a data structure corresponding to the AR content item 134 may indicate at least one of interactions related to each of the interactive elements 136 of the AR content item 134 or interactions related to a combination of the interactive elements 136 of the AR content item 134.

In one or more examples, the AR content usage system 130 may also track one or more metrics related to the usage of one or more interactive elements 136 of one or more AR content items 134. For example, the AR content usage system 130 may determine a number of times that an AR content item 134 was shared with another user of the client application 104 and a number of times that the AR content item 134 was included in a message sent to another user of the client application 104. Additionally, the AR content usage system 130 may determine a number of times that an AR content item 134 was applied to user content and a number of times that an interactive element 136 of the AR content item 134 was selected by a user of the client application 104. In additional examples, the AR content usage system 130 may collectively track the usage of a number of the interactive elements 136 of one or more AR content items 134. To illustrate, the AR content usage system 130 may determine a total number of interactions related to the AR content item 136. In these situations, the AR content usage system 130 may determine a sum that includes a number of times that an AR content item 134 has been shared, a number of times that the AR content item 134 has been related to a message, a number of times that the AR content item 134 has been applied to user content, and a number of times that interactive elements 136 of the AR content item 134 have been interacted with by users of the client application 104.

The AR content usage system 130 may generate AR content usage data 138 indicating an amount of interaction with AR content items 134 by users of the client application 104. In various examples, the AR content usage data 138 may be associated with user profile data 140. For example, the AR content usage system 130 may identify users of the client application 104 that interact with AR content items 134. In one or more examples, identifiers of users of the client application 104 may be determined by the AR content usage system 130. Based on identifying users of the client application 104 that interacted with one or more AR content items 134, the AR content usage system 130 may determine characteristics of the users. In one or more examples, the AR content usage system 130 may determine demographic information related to users that interact with AR content items 134, such as age, gender, occupation, education, one or more combinations thereof, and the like. In additional examples, the AR content usage system 130 may determine location information of users of the client application 104 that interact with AR content items 134. In various examples, the location information may be determined based on at least one of user input or geographic positioning system (GPS) data.

In further examples, that AR content usage system 130 may determine additional information about users of the client application 104 that correspond to interactions by the users of client application 104 with content consumed via the client application 104. For example, the AR content usage system 130 may determine usage metrics for one or more features of the client application 104 in relation to users of the client application 104 that interact with AR content items 134. To illustrate, the AR content usage system 130 may determine an amount of usage of one or more social networking features of the client application 104 by users of the client application 104 that interact with one or more AR content items 134. The AR content usage system 130 may also determine an amount of usage of one or more messaging features of the client application 104 by users of the client application 104 that interact with one or more AR content items 134. In addition, the AR content usage system 130 may determine an amount of usage of one or more search features of the client application 104 by users of the client application 104 that interact with one or more AR content items 134. Further, the AR content usage system 130 may determine sources of content that are accessed by users of the client application 104 that interact with one or more AR content items 134. The sources of content may include one or more additional users of the client application 104, one or more media organizations, one or more news organizations, one or more retailers, one or more manufacturers, one or more governmental organizations, one or more authors, one or more blogs, one or more websites, one or more periodicals, one or more combinations thereof, and so forth. In various examples, the AR content usage system 130 may also determine types of AR content items 134 that are interacted with by users of the client application 104. In one or more illustrative examples, the AR content usage system 130 may determine interactions with AR content items 134 that comprise overlays of at least one of image content or video content by users of the client application 104. Additionally, the AR content usage system 130 may determine interactions with AR content items 134 that include animations created by users of the client application 104.

In one or more implementations, the AR content usage system 130 may determine characterizations of users of the client application 104 that interact with one or more AR content items 134. In one or more examples, the AR content usage system 130 may determine one or more characteristics of users of the client application 104 that interact with an AR content item 134. In various examples, the AR content usage system 130 may determine a characterization of users of the client application 104 that interact with the AR content item 134 by determining one or more characteristics that are associated with at least a threshold number of the users of the client application 104 that interact with the AR content item 134. For example, the AR content usage system 130 may determine one or more demographic characteristics that are common to at least a threshold number of users of the client application 104 that interact with the AR content item 134. The AR content usage system 130 may also determine one or more location characteristics that are common to at least a threshold number of users of the client application 104 that interact with the AR content item 134. In additional examples, the AR content usage system 130 may determine one or more AR content usage characteristics that are common to at least a threshold number of users of the client application 104 that interact with the AR content item 134.

Based on characteristics of users of the client application 104 that interact with the AR content item 134, the AR content usage system 130 may determine a target audience for the AR content item 134. The target audience for the AR content item 134 may correspond to users of the client application 104 that have at least a threshold likelihood of interacting with the AR content item 134. In this way, the characterization of users of the client application 104 that may interact with the AR content item 134 may provide insight to one or more creators of the AR content item 134. Thus, the one or more creators of the AR content item 134 may identify users of the client application 104 that have not previously interacted with the AR content item 134, but have at least a threshold likelihood of interacting with the AR content item 134. In these scenarios, the one or more creators of the AR content item 134 may cause the server system 108 to bring awareness to the target audience of the AR content item 134. The server system 108 may bring awareness of the AR content item 134 to the target audience via at least one of advertisements or recommendations related to the AR content item 134. Further, the server system 108 may bring awareness of the AR content item 134 to the target audience by increasing the weighting of the AR content item 134 in search results for AR content submitted by users of the client application 104 included in the target audience.

The AR content usage system 130 may generate user interface data that corresponds to user interfaces that include information about usage metrics with respect to one or more AR content items 134. The AR content usage system 130 may also generate user interface data that includes information indicating characteristics of users of the client application 104 that interact with one or more AR content items 134. In various examples, creators of AR content items 134 may send requests to the server system 108 for information about users of the client application 104 that interact with one or more AR content items 134 generated by the creators. The requests may be directed to metrics related to specified characteristics of users of the client application 104 that interact with one or more AR content items 134 generated by an augmented reality content creator. For example, an augmented reality content creator may send a request to the server system 108 to obtain at least one of age, location, gender, occupation, or education of users of the client application 104 that interact with one or more AR content items 134 of the augmented reality content creator. In an additional example, the server system 108 may receive a request from an augmented reality content creator to obtain at least one of a frequency of interaction with AR content items 134 generally or a frequency of interaction of a type of AR content items 134 interacted with by users of the client application 104 that also interact with one or more AR content items 134 of the augmented reality content creator. In various examples, the AR content usage system 130 may provide one or more templates that may be used by augmented reality content creators to request information about at least one of interactions with AR content items 134 of the creators or characteristics of users of the client application 104 that interact with AR content items 134 of the creator.

In response to a request from an augmented reality content creator for information about one or more of the augmented reality content items produced by the creator, the AR content usage system 130 may operate to determine at least one of augmented reality content usage metrics or characteristics of users of the client application 104 related to the AR content items 134 of the creator. The AR content usage system 130 may then generate user interface data that indicates the information satisfying the request. In various examples, the AR content usage system 130 may generate user interface data that corresponds to a dashboard that is accessible to augmented reality content creators, where the dashboard includes information corresponding to an information request received by the server system 108 from the augmented reality content creator. In one or more examples, the dashboard may include one or more standardized features that include information about the use of AR content items 134 that are provided to each augmented reality content creator requesting augmented reality content information from the server system 108. In additional examples, the dashboard may include one or more customized features that include information about the use of AR content items 134 based on specific requests of augmented reality content creators that are received by the server system 108.

The AR content metrics analysis system 132 may analyze information related to a number of usage metrics of AR content items 134. In various examples, the AR content metrics analysis system 132 may analyze usage metrics for AR content items 134 with respect to an outcome specified by an AR content creator. For example, an AR content creator may specify an outcome with respect to an AR content item 134 that corresponds with an amount of time that individual users of the client application 104 interact with the AR content item 134. In one or more additional examples, an AR content item 134 may be related to a product offered for purchase and an AR content creator may indicate an outcome with respect to the AR content item 134 that corresponds to a number of purchases of the product after one or more interactions related to the AR content item 134. In various example, the AR content metrics analysis system 132 may analyze one or more usage metrics with respect to an AR content item 134 by determining a level of correlation between individual usage metrics and the outcome specified by the AR content creator. As a level of correlation between a usage metric and the outcome specified by the AR content creator increases, the probability may increase that changes with respect to the usage metric have an impact on the specified outcome.

In one or more implementations, the AR content metrics analysis system 132 may generate AR content item metrics fitness data 142 that indicates a measure of fitness of one or more usage metrics with respect to outcomes specified by AR content creators. The measures of fitness for one or more usage metrics with respect to one or more outcomes may be determined based on the level of correlation between the usage metrics and the outcome. In one or more examples, as the level of correlation between a usage metric and an outcome increases, the measure of fitness for the usage metric with respect to the outcome also increases. In various examples, the AR content item metrics fitness data 142 may indicate a measure of fitness for a number of usage metrics with respect to individual outcomes specified by AR content creators. The measure of fitness for an outcome specified by a first AR content creator with respect to a usage metric may be different from a measure of fitness for an outcome specified by a second AR content creator with respect to the usage metric.

Figure 2:
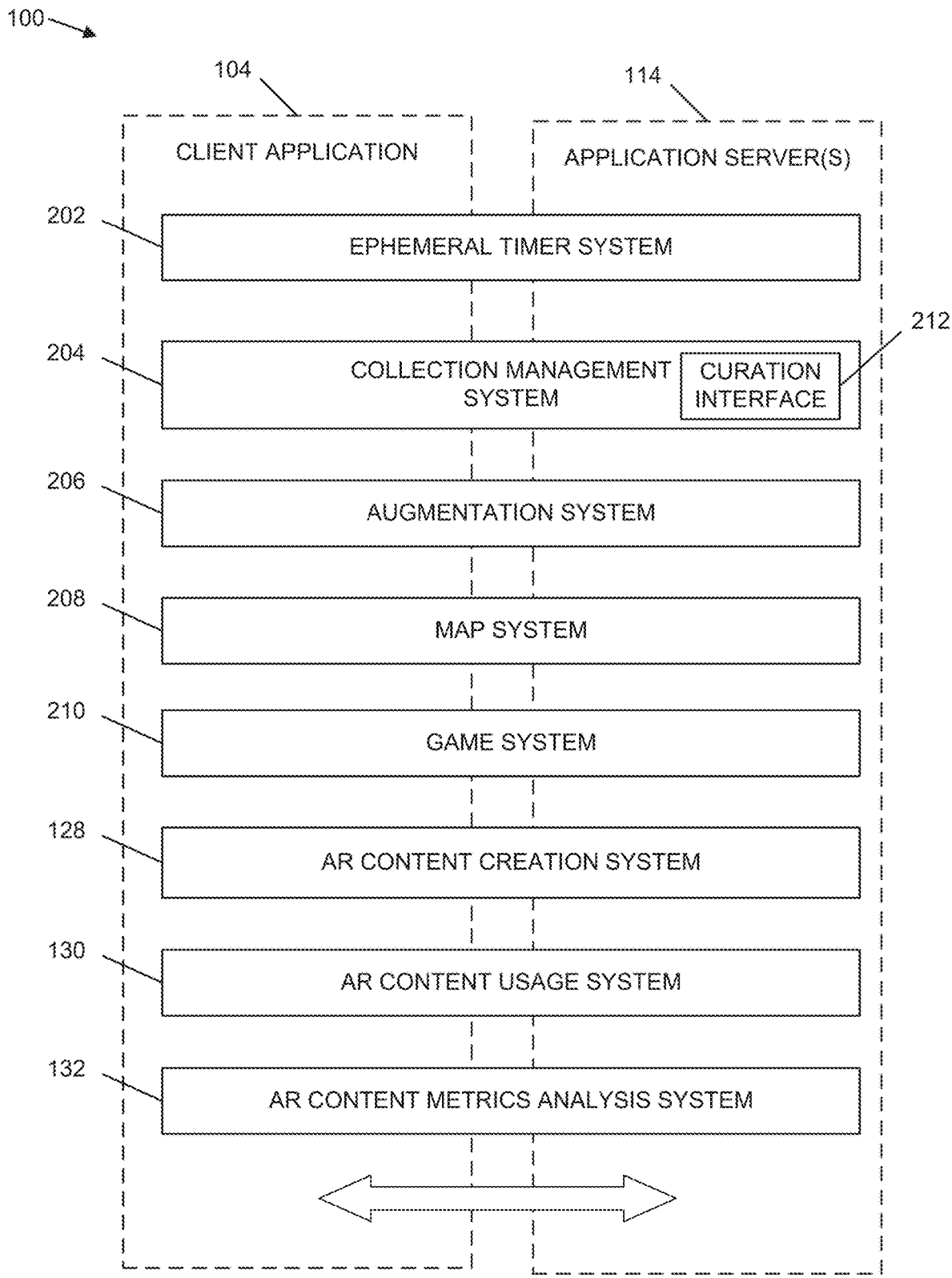
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, the AR content creation system 128, the AR content usage system 130, and the content management system 132.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The AR content creation system 128 may generate one or more user interfaces that accept input that may be used to generate augmented reality content. The input obtained via the one or more user interfaces may be used to determine one or more features to associate with augmented reality content. In various examples, the one or more user interfaces generated using data from the AR content creation system 128 may include creative tools that enable users to associate one or more visual effects with augmented reality content. In one or more examples, the one or more user interfaces generated using data obtained from the AR content creation system 128 may associate one or more audio effects with augmented reality content. The augmentation system 206 may operate in conjunction with the AR content creation system 128 to generate augmented reality content according to the input obtained via the user interfaces generated by the AR content creation system 128. For example, the augmentation system 206 may operate in conjunction with the AR content creation system 128 to generate computer-readable instructions that correspond to augmented reality content that are executable to produce at least one of visual effects or audio effects in relation to user content. The AR content creation system 128 may also generate user interface data that enables the tracking of interactions with augmented reality content by users of the client application 104. In one or more examples, the AR content creation system 128 may generate user interface data that enables interactions with one or more features of augmented reality content and that enables the interactions with the one or more features to be recorded.

The AR content usage system 130 may determine an amount of usage of augmented reality content. In one or more implementations, the AR content usage system 130 may determine a number of interactions with the augmented reality content that is executed via the client application 104. In various examples, the AR content usage system 130 may determine a number of interactions with one or more specified features of augmented reality content that is executed via the client application 104. In addition, the AR content usage system 130 may determine characteristics of users of the client application 104 that interact with augmented reality content. For example, the AR content usage system 130 may determine characterizations of users of the client application 104 that interact with augmented reality content that indicate at least one of demographic features, location information, usage metrics related to one or more features of the client application 104, usage metrics related to one or more augmented reality content items, or content consumption information with respect to users of the client application 104 that interact with one or more augmented reality content items.

Further, the AR content metrics analysis system 132 may analyze usage metrics with respect to AR content items, such as usage of interactive elements of the AR content items, to determine measures of fitness with respect to usage metrics being indicative of an outcome specified by an AR content creator. The measures of fitness may be based on a level of correlation between a given usage metric and an outcome provided by an AR content creator. In this way, the AR content metrics analysis system 132 may provide customized information to AR content creators based on outcomes that are specified by the individual AR content creators, where different AR content creators may specify different outcomes.

Figure 3:
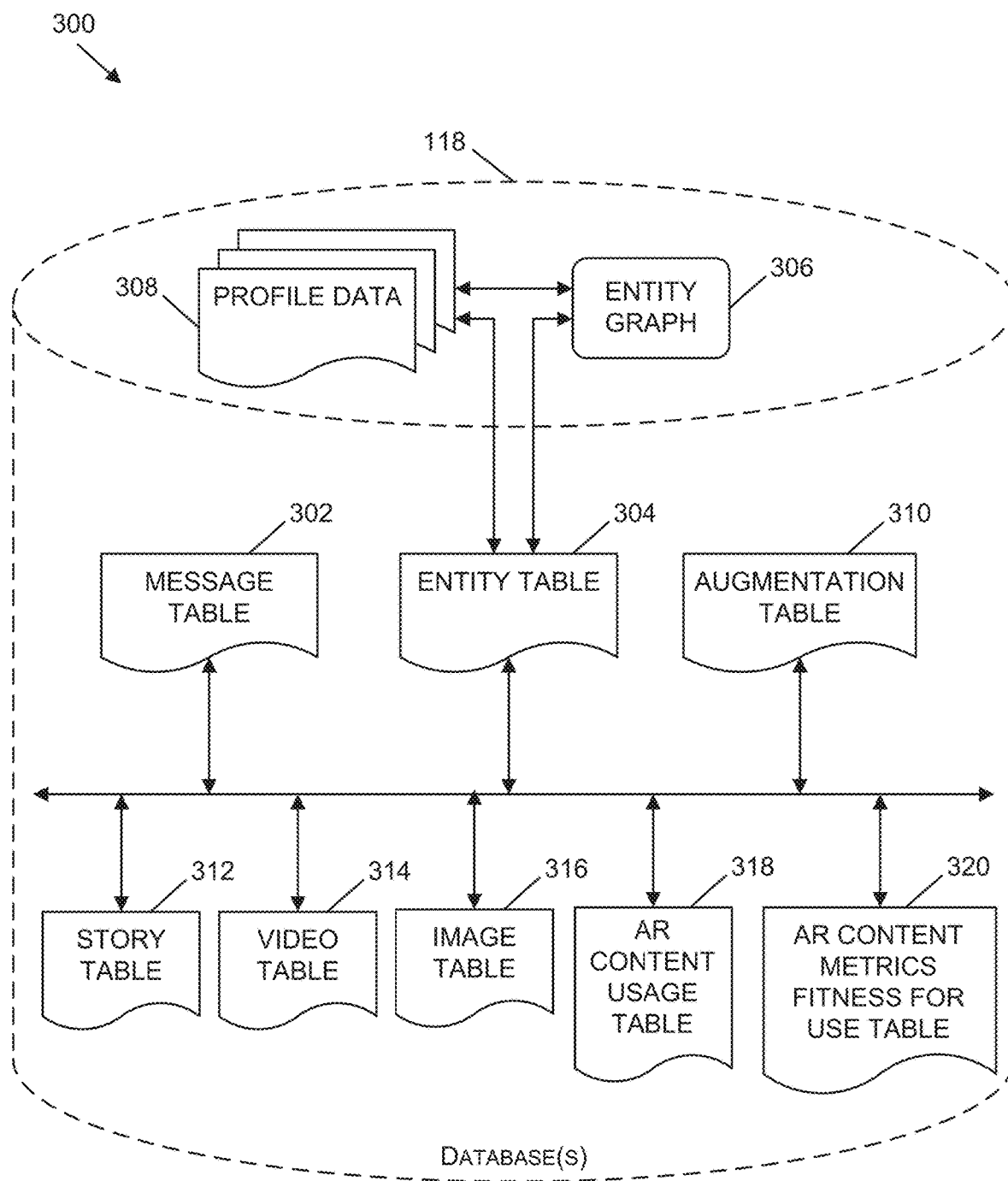
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store an AR content usage table 318 that stores data indicating usage metrics for augmented reality content. In various examples, the AR content usage table 318 may include one or more data structures that store usage metrics for individual augmented reality content items. The metrics may indicate a number of interactions with augmented reality content by users of the client application 104. In addition, the database(s) 118 may store an AR content metrics fitness for use table 320 that stores measures of fitness for usage metrics with respect to outcomes indicated by one or more AR content creators. For example, the AR content metrics fitness for use table 320 may, for a given AR content creator, indicate measures of fitness for one or more usage metrics with respect to one or more outcomes specified by the AR content creator.

Figure 4:
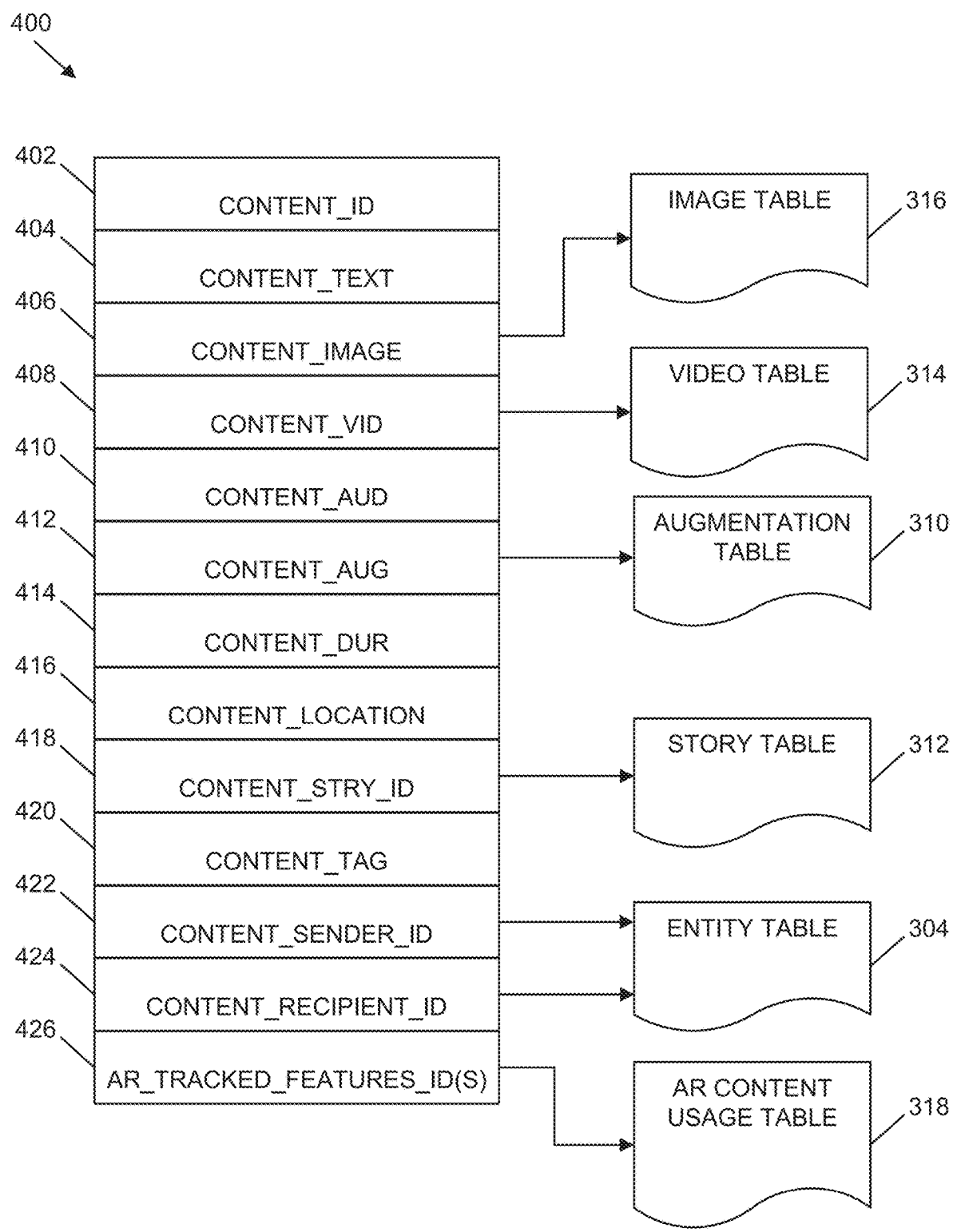
FIG. 4 is a schematic diagram illustrating an example framework for content that may be accessible via a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

AR tracked features identifier(s) 426: an identifier of features of augmented reality content corresponding to the content 400 that may have an amount of usage that is being monitored or tracked. In one or more examples, an AR tracked features identifier 426 may correspond to a feature of an augmented reality content item that is associated with a user interface element that is selectable by users of the client application 104.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentation data 412 may point to data stored in an augmentation table 310, values stored within the content story identifier 418 may point to data stored in a story table 312, and values stored within the content sender identifier 422 and the content receiver identifier 424 may point to user records stored within an entity table 304. Further, values of the AR tracked features identifier(s) 426 may point to data stored within a data structure that includes the AR content usage table 318. In these scenarios, the data stored in the AR content usage table 318 for a respective AR tracked features identifier 426 may correspond to an amount of interaction with a feature of an augmented reality content item of the content 400 by users of the client application 104.

Figure 5:
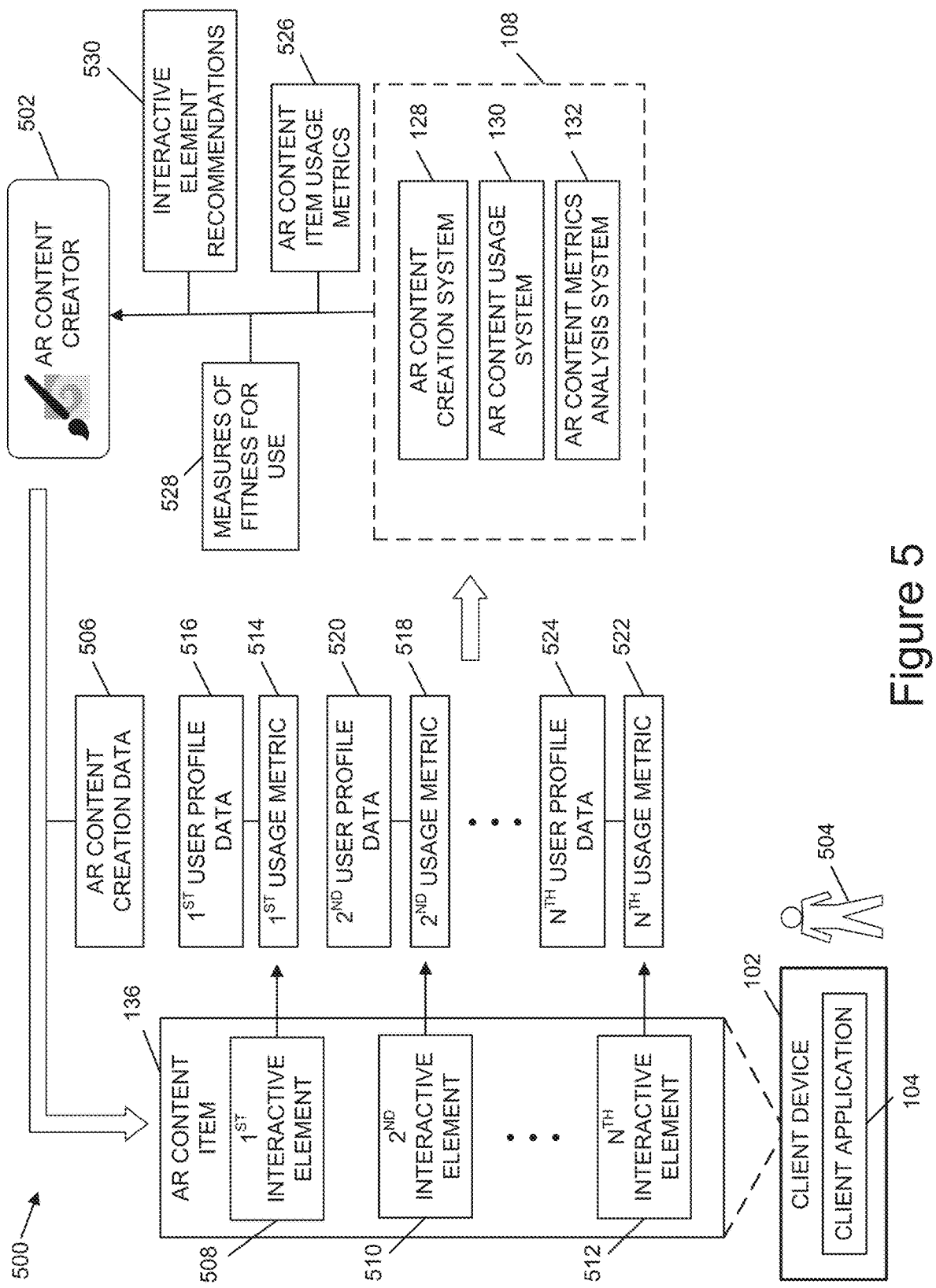
FIG. 5 is a diagrammatic representation illustrating an architecture to analyze augmented reality content usage data, in accordance with one or more example implementations.

FIG. 5 is a diagrammatic representation illustrating an architecture 500 to analyze augmented reality content usage data, in accordance with one or more example implementations. The architecture 500 may include an AR content creator 502. The AR content creator 502 may include one or more entities that create augmented reality content to be executed by the client application 104. In one or more examples, the AR content creator 502 may include one or more users of the client application 104. In additional examples, the AR content creator 502 may include one or more third parties that provide augmented reality content for the client application 104. In further examples, the AR content creator 502 may include a service provider that maintains and implements the server system 108. In these scenarios, the AR content creator 502 may be a service provider that maintains and implements the client application 104.

In one or more illustrative examples, the AR content creator 502 may create the AR content item 134. The AR content item 134 may be executed by the client application 104 to generate at least one of one or more visual effects or one or more audio effects with regard to user content accessible using the client application 104. The AR content item 134 may include computer readable instructions that are executable by the client application 104 to modify at least one of the appearance or sound features of the AR content item 134. For example, a user 504 of the client application may generate user content. The user content may include one or more content items that comprise at least one of image content, video content, or audio content. In various examples, the user content may be captured by the user 504 via one or more input devices of the client device 102. To illustrate, the user 504 may utilize one or more cameras of the client device 102 to capture image content. In these situations, the AR content item 134 may modify the image content by modifying an appearance of one or more objects included in the user content. In additional examples, the user 504 may utilize one or more microphones of the client device 102 to capture audio content. In these scenarios, the AR content item 134 may modify at least a portion of the audio content included in the user content.

The AR content creator 502 may provide AR content creation data 506 that is used to generate the AR content item 134. The AR content creator 502 may provide the AR content creation data 506 to the server system 108. In one or more implementations, the AR content creation system 128 may use the AR content creation data 506 to generate the AR content item 134. In one or more examples, the AR content creation data 506 may be provided using one or more user interfaces. In various examples, the one or more user interfaces may be generated by the AR content creation system 128. The one or more user interfaces may include one or more user interface elements to capture data that may be used to generate augmented reality content.

In various examples, the AR content creation data 506 may indicate one or more interactions by users of the client application 104 that are to be monitored or tracked by the server system 108 with respect to the AR content item 134. For example, the AR content creation data 506 may indicate that the number of times that the AR content item 134 is shared are to be tracked by the AR content usage system 130. In additional examples, the AR content creation data 506 may indicate that the number of times that the AR content item 134 is included in a message are to be tracked by the AR content usage system 130. In further examples, the AR content creation data 506 may indicate that the number of times that the AR content item 134 is applied to user content is to be tracked by the AR content usage system 130. The AR content creation data 506 may also indicate that usage of one or more features of the AR content item 134 is to be tracked. To illustrate, the AR content item 134 may include one or more features with which users of the client application may interact. In one or more examples, the AR content item 134 may include one or more features that may be at least one of selected, moved, or modified by users of the client application 104. Interaction with a feature of the AR content item 134 may be based on user input obtained via one or more input devices of the client device 102. For example, interaction with a feature of the AR content item 134 may include at least one of touching a user interface element of the AR content item 134 using a finger or other implement for at least a threshold period of time, hovering over a user interface element of the AR content item 134 using a finger or other implement, selecting and moving a user interface element of the AR content item 134, swiping a user interface element of the AR content item 134, performing a pinching operation (e.g., bringing two fingers closer together) with respect to a user interface element of the AR content item 134, or an expanding operation (e.g., moving two fingers away from each other) with respect to a user interface element of the AR content item 134.

In one or more illustrative examples, the AR content item 134 may include an animation that includes a character with which the user 504 may interact. For example, the user 504 may cause the character to move one or more body parts. In these situations, the AR content creation data 506 may indicate that at least one of the body parts is a feature of the AR content item 134 for which interactions are to be tracked by the server system 108. The user 504 may also cause the character to change locations within a user interface. In various examples, the AR content creation data 506 may indicate that modifying a location of the character may be an interaction with the AR content item 134 that is to be tracked by the server system 108. Additionally, the user 504 may cause the character to make one or more audible noises. In these scenarios, the AR content creation data 506 may indicate that causing the character to produce at least one of the audible noises is a feature of the AR content item 134 that is to be tracked by the server system 108.

The AR content creation data 506 may be obtained via one or more templates that indicate at least one of features or interactions with respect to AR content items for which user interactions may be tracked by the server system 108. In these scenarios, the AR content creator 502 may use a template to indicate at least one feature or interaction with respect to the AR content item 134 that is to be tracked by the server system 108. Thus, in situations where one or more templates are used to indicate at least one of features or interactions of augmented reality content items that are to be tracked, the AR content creation system 128 implements a standardized approach to identifying at least one of features or interactions of augmented reality content items to be monitored or tracked by the server system 108. In additional examples, the AR content creation system 128 may provide user interfaces that enable user driven selection of at least one of features or interactions of augmented reality content items that are to be tracked. To illustrate, the AR content creator 502 may use an input device to indicate any number of features of the AR content item 134, interactions with the AR content item 134, or both that are to be tracked by the server system 108. In these situations, the AR content creation system 128 may implement a customized approach to identifying at least one of features or interactions of augmented reality content items that are to be monitored or tracked by the server system 108. In one or more implementations, the AR content creation system 128 may implement a combination of a customized and standardized approach to the selection of at least one of features or interactions with AR content items that are to be monitored by the server system 108.

In the illustrative example of FIG. 5, the AR content item 134 may include a first interactive element 508, a second interactive element 510, up to an Nth interactive element 512. At least one of the first AR interaction, the second interactive element 510, or the Nth interactive element 512 may be tracked by AR content usage system 130. For example, the AR content creator 502 may indicate in the AR content creation data 506 that the server system 108 is to monitor for at least one of the first interactive element 508, the second interactive element 510, or the Nth interactive element 512. In one or more examples, at least one of the first interactive element 508, the second interactive element 510, or the Nth interactive element 512 may be related to features of the AR content item 134 with which the user 504 may interact. For example, at least one of the first interactive element 508, the second interactive element 510, or the Nth interactive element 512 may correspond to an object or a portion of an object with which the user 504 may interact. In additional examples, at least one of the first interactive element 508, the second interactive element 510, or the Nth interactive element 512 may correspond to additional actions that may be performed with respect to the AR content item 134. To illustrate, at least one of the first interactive element 508, the second interactive element 510, or the Nth interactive element 512 may correspond to the user 504 sharing user content related to the AR content item 134 with one or more users of the client application 104. In various examples, user content that is related to the AR content item 134 may be shared by the user 504 via social networking functionality of the client application 104. In additional examples, at least one of the first interactive element 508, the second interactive element 510, or the Nth interactive element 512 may correspond to the user 504 generating a message that includes user content related to the AR content item 134, where the message is accessible to recipients via the client application 104. In one or more implementations, at least one of the first interactive element 508, the second interactive element 510, or the Nth interactive element 512 may correspond to a user interface element that is displayed via the client application 104.

The first interactive element 508 may correspond to a first usage metric 514. The first usage metric 514 may indicate a frequency that users of the client application 104 perform the first interactive element 508. In one or more examples, the first usage metric 514 may indicate a number of times that one or more users of the client application 104 activate the first interactive element 508. In various examples, the first usage metric 514 may indicate a number of times that users of the client application 104 activate the first interactive element 508 within a period of time, such as one hour, one day, one week, one month, etc. In additional examples, the first usage metric 514 may correspond to an average number of times that individual users of the client application 104 activate the first interactive element 508. The first usage metric 514 may be determined by the AR content usage system 130 based on data obtained from instances of the client application 104 that are executed by client devices 102 of users of the client application 104.

The first interactive element 508 may also be associated with first user profile data 516. The first user profile data 516 may include information about users of the client application 104 that activated the first interactive element 508. The first user profile data 516 may indicate at least one of demographic information or location information of users of the client application 104 that activated the first interactive element 508. The first user profile data 516 may also indicate content usage characteristics of users of the client application 104 that activated the first interactive element 508. The content usage characteristics may indicate sources of content consumed by users of the client application 104 that performed the first interactive element 508. The content usage characteristics may also indicate types of augmented reality content interacted with by users of the client application 104. Further, the content usage characteristics may indicate individual AR content items that are interacted with by users of the client application 104. In one or more examples, the content usage characteristics may indicate a frequency of interaction with at least one of one or more sources of content or types of content by users of the client application 104 that performed the first interactive element 508.

In one or more examples, in response to obtaining information indicating that the first interactive element 508 has been performed or activated, the AR content usage system 130 may determine a user of the client application 104 that activated the first interactive element 508. In various examples, individual users of the client application 104 may be associated with an identifier. For example, the identifier may include a number of alphanumeric characters or symbols that uniquely identify an individual user of the client application 104. The identifier may be provided by an individual user of the client application 104 or the identifier may be determined by a service provider that implements and maintains at least one of the client application 104 or the server system 108. In various examples, one or more actions performed by individual users of the client application 104 may generate data that includes an identifier of the user of the client application 104 and that indicates the one or more actions performed. The data may be sent to the server system 108 and analyzed by the AR content usage system 130 to determine the respective user of the client application 104 that performed the one or more actions. Additionally, the AR content usage system 130 may access profile information of the respective user that performed the one or more actions. To illustrate, the AR content usage system 130 may query one or more data stores, such as the database(s) 118, using the identifier of the user of the client application 104 that performed the one or more actions to access profile information of the user stored by the one or more data stores. In this way, the AR content usage system 130 may associate one or more characteristics of the user that performed the one or more actions. The AR content usage system 130 may aggregate profile information of a number of users of the client application 104 that activate the first interactive element 508 to determine a characterization of users of the client application 104 that interact with the first interactive element 508.

In a manner that is similar to the first interactive element 508, the second interactive element 510 may be associated with a second usage metric 518 and second user profile data 520 and the Nth interactive element 512 may be associated with an Nth usage metric 522 and Nth user profile data 524. Additionally, the AR content usage system 130 may determine users of the client application 104, such as the user 504, that interact with at least one of the second interactive element 510 or the Nth interactive element 512 based on identifiers of the users of the client application 104.

In one or more examples, the AR content usage system 130 may generate a dashboard that is accessible to the AR content creator 502. The dashboard may include one or more user interfaces that include information about the AR content item 134. The information included in the dashboard may include AR content item usage metrics 526. The AR content item usage metrics 526 may be determined by the AR content usage system 130 and indicate quantitative measures indicating interactions by users of the client application 104 with respect to the AR content item 134. In various examples, the AR content item usage metrics 526 may indicate at least one of a frequency or a periodicity with which users of the client application 104 perform one or more of the first interactive element 508, the second interactive element 510, or the Nth interactive element 512. The AR content item usage metrics 526 may be displayed via at least one of one or more charts, one or more tables, or one or more graphs.

The dashboard may also include AR content user characterization information. The AR content user characterization information may indicate characteristics of users of the client application 104 that activate or otherwise interact with at least one of the first interactive element 508, the second interactive element 510, or the Nth interactive element 512. The AR content user characterization information may be generated by the AR content usage system 130. In one or more examples, the AR content user characterization information may include information about characteristics of users of the client application 104 that interact with the AR content item 134 in relation to other users of the client application 104. For example, the AR content user characterization information may indicate a number of users of the client application 104 that activate the first interactive element 508 in relation to a number of users of the client application 104 that interact with other AR content items 134. To illustrate, the AR content user characterization information may indicate that users of the client application 104 that activate the first interactive element 508 are more likely to interact with augmented reality content via the client application 104 than users of the client application 104 that do not interact with augmented reality content via the client application 104. Additionally, the AR content user characterization information may indicate at least one of one or more demographic features or one or more location features that correspond to at least a threshold number of users of the client application 104 that perform the first interactive element 508. In one or more illustrative examples, the AR content user characterization information may indicate that at least 50% of the users of the client application 104 that activate the first interactive element 508 are between the ages of 25 and 40 and that at least 75% of the users of the client application 104 that activate the first interactive element 508 live in a city with a population greater than 250,000 people.

Information included in the dashboard for the AR content creator 502 may be based on dashboard requests received by the server system 108 from one or more computing devices of the AR content creator 502. The dashboard requests may indicate one or more criteria with respect to at least one of content usage metrics or characteristics of users of the client application 104 that interacted with AR content generated by the AR content creator 502. In one or more examples, the AR content usage system 132 may provide one or more user interfaces that may be used by the AR content creator 502 to specify information to include in the dashboard. The one or more user interfaces may include options indicating types of information to include in the dashboard. In the illustrative example of FIG. 5, the server system 108 may send dashboard UI information to the AR content creator 502 that includes information used to display the one or more user interfaces of the dashboard.

In one or more examples, the AR content usage system 130 may provide one or more user interfaces that include options that are selectable to include metrics indicating frequency of usage of the AR content item 134, such as frequency of occurrence of at least one of the first interactive element 508, the second interactive element 510, or the Nth interactive element 512. The one or more user interfaces may also include options that are selectable to cause information to be displayed via the dashboard that is related to one or more characteristics of users of the client application 104 that interact with the AR content item 134. To illustrate, the AR content usage system 130 may provide one or more user interfaces that include options selectable to view one or more demographic characteristics of users of the client application 104 that interact with the AR content item 134, one or more location characteristics of users of the client application 104 that interact with the AR content item 134, one or more content consumption history characteristics of users of the client application 104 that interact with the AR content item 134, one or more combinations thereof, and so forth.

Further, the AR content usage system 130 may provide one or more user interfaces that include options that are selectable to indicate one or more visual formats used to present the information included in the dashboard. For example, the AR content usage system 130 may provide one or more user interfaces that include one or more options that are selectable to display at least one of the AR content item usage metrics 526 or the AR content user characterization information in a numerical formal. In additional examples, the content management system 132 may provide one or more user interfaces that include one or more options that are selectable to display at least one of the AR content item usage metrics 526 or the AR content user characterization information in a tabular format. The AR content usage system 130 may also provide one or more user interfaces that include one or more options that are selectable to display at least one of the AR content item usage metrics 526 or the AR content user characterization information in a graphical form, such as a pie graph, a line graph, a bar graph, combinations thereof, and the like.

In one or more implementations, the AR content usage system 130 may provide information indicating a target audience for the AR content item 134. In various examples, the information related to the target audience for the AR content item 134 may be included in the dashboard UI information. In additional examples, target audience information may be provided separate from the dashboard UI information. In one or more examples, the target audience may be determined by the AR content usage system 130 based on usage metrics and user profile data of users of the client application 104 that interact with augmented reality content of the AR content creator 502, such as the AR content item 134. The target audience information may indicate at least one of demographic characteristics or location characteristics of users of the client application 104 that have at least a threshold likelihood of interacting with the AR content item 134. For example, the target audience information may indicate at least one of demographic characteristics or location characteristics of users of the client application 104 that have at least a threshold probability of interacting with the first interactive element 508. In addition, the target audience information may indicate at least one of demographic characteristics or location characteristics of users of the client application 104 that have at least a threshold probability of interacting with the second interactive element 510. In various examples, the target audience information with respect to the first interactive element 508 may be different from the target audience information with respect to the second interactive element 510. Further, the target audience information may indicate content consumption characteristics of users of the client application 104 that have at least a threshold probability of interacting with the AR content item 134, such as activating the first interactive element 508 or the second interactive element 510. The content consumption characteristics may include types of content (e.g., video content, audio content, image content, text content, augmented reality content, etc.) viewed or accessed by users of the client application 104, sources of content viewed or accessed by users of the client application 104, frequency of usage of one or more types of content via the client application 104, frequency of usage of content from one or more sources via the client application 104, one or more channels used to access content via the client application 104, or one or more combinations thereof.

After determining a target audience for the AR content item 134, the server system 108 may obtain input from the AR content creator 502 indicating one or more channels that may be used to promote the AR content item 134 via the client application 104. In one or more examples, the AR content creator 502 may indicate that the AR content item 134 is to be promoted to users of the client application 104 included in the target audience by presenting the AR content item 134 in a relatively high position of search results that are produced in response to search requests for AR content that are directed to one or more keywords associated with the AR content item 134. In these scenarios, the AR content item 134 may be weighted in a manner that moves the AR content item 134 closer to the top of search results provided to users of the client application 104 included in the target audience that submit search requests to the server system 108. In one or more additional examples, the AR content creator 502 may indicate that the AR content item 134 is to be promoted to users of the client application 104 included in the target audience by including the AR content item 134 in content recommendations provided via the client application 104.

In one or more implementations, a threshold probability of users of the client application 104 activating the first interactive element 508 may be determined by analyzing usage metrics and user profile data for the first interactive element 508 in relation to average usage metrics for at least a subset of additional AR content items accessible via the client application 104. For example, the AR content usage system 130 may determine an average amount of usage of the AR content item 134 across a number of users of the client application 104 and then determine characteristics of users of the client application 104 that use the AR content item 134 more than the average amount of usage for the AR content item 134. The AR content usage system 130 may determine a threshold probability for users of the client application 104 to be included in the target audience for the AR content item 134 based on the number of users of the client application 104 that may be included in the target audience. The AR content usage system 130 may determine a likelihood or probability of a user of the client application 104 being in the target audience for the AR content item 134 based on a measure of similarity between characteristics of the user and characteristics of users of the client application 104 that have at least a threshold amount of usage of the AR content item 134. The likelihood or probability of the user of the client application 104 being in the target audience may be analyzed in relation to the threshold probability to determine whether or not to include the user in the target audience of the AR content item 134.

In one or more illustrative examples, the AR content item 134 may be related to one or more products. The one or more products may be available for purchase via the client application 104. In various examples, the first interactive element 508 may correspond to selection of a first product within a user interface generated by the client application 104, the second interactive element 510 may correspond to selection of a second product within a user interface generated by the client application 104, and the Nth interactive element 512 may correspond to selection of an Nth product within a user interface generated by the client application 104. In these scenarios, the first product may be associated with a first selectable user interface element, the second product may be associated with a second selectable user interface element, and the Nth product may be associated with an Nth selectable user interface element. In response to a user of the client application 104 activating or selecting the first interactive element 508, the second interactive element 510, or the Nth interactive element 512, one or more visual effects may be applied to user content. In one or more examples, the first interactive element 508 may correspond to a first product and selection of a user interface element that corresponds to the first product may cause one or more visual effects related to characteristics of the first product to be applied to user content. In situations where the user content includes one or more facial features of a user of the client application 104 and the first product is a beauty product, selection of the first user interface element corresponding to the first product may cause the user content to be modified in a way that shows the first product being applied to the one or more facial features, such as applying eye shadow to a region around one or more eyes included in the user content. In one or more scenarios where the second interactive element 510 corresponds to a second product, selection of the user interface element that corresponds to the second product may cause the user content to be modified in a way that shows the second product being applied to one or more facial features. The first product and the second product may be a same type of product (e.g., eye shadow), but may have different characteristics, such as different color, different tone, different brightness, different shading, different glossiness, and the like. In additional examples, the first product and the second product may be different types of products. To illustrate, the first product may be eye shadow and the second product may be lipstick. Further, the first product and the second product may be at least one of produced by different manufacturers or offered for purchase by different retailers. In other situations, the first product and the second product may be at least one of produced by the same manufacturer or offered for purchase by the same retailer.

In one or more illustrate examples, the dashboard may include a number of options that are selectable to view information about one or more products related to augmented reality content items that are executed by the client application 104. The dashboard may arrange data related to the use of augmented reality content items that correspond to a number of products that are related to the augmented reality content items. The information included in the dashboard may indicate a number of times or a frequency of use of augmented reality content items related to a number of products. In various examples, the information included in the dashboard may indicate a number of times or a frequency that visual effects of augmented reality content items are applied to user content, where the visual effects are related to applying products to one or more objects included in the user content.

The AR content metrics analysis system 132 may analyze usage data for a number of AR content items 134 to determine AR content usage metrics 526. The AR content usage metrics 526 may indicate a level of interaction between users of the client application 104 and AR content items 134. In addition, the AR content metrics analysis system 132 may determine measures of fitness for use 528 with respect to the AR content item usage metrics 526. The measures of fitness for use 528 may indicate an amount of correlation between respective AR content item usage metrics 526 and outcomes provided by the AR content creator 502. The outcomes may correspond to results that the AR content creator 502 would like to achieve with respect to interactions between users of the client application 104 and the AR content item 134. In various examples, the outcomes may correspond to one or more criteria specified by the AR content creator 502 with respect to usage of AR content items created by the AR content creator 502. In various examples, the AR content metrics analysis system 132 may determine recommendations with respect to AR content item usage metrics 526 for the AR content creator 502 based on a level of correlation of one or more AR content item usage metrics with respect to a given outcome being greater than a level of correlation of one or more additional AR content item usage metrics with respect to the outcome.

Based on the recommendations, the server system 108 may receive input from the AR content creator 502 to monitor the one or more recommended AR content item usage metrics. In one or more examples, the one or more recommend AR content item usage metrics may correspond to a specified interaction with the augmented reality content item 134 or an action performed by users of the client application 104 related to the augmented reality content item 134. Monitoring the one or more recommended AR content item usage metrics may include determining a number of instances of the action or a number of instances of the interaction with respect to the AR content item 134. At least one of the AR content usage system 130 or the AR content metrics analysis system 132 may generate a user interface that displays the AR content item usage metrics 526 being monitored. In various examples, at least a portion of the AR content item usage metrics 526 displayed in the user interface may be identified based on selections of one or more AR content item usage metrics 526 by the AR content creator 502 from a number of possible AR content item usage metrics 526 that may be monitored and displayed.

In one or more illustrative examples, the AR content creator 502 can specify that an outcome of the AR content item 134 corresponds to a number of messages exchanged between users of the client application 104 that are related to the AR content item 134. The AR content metrics analysis system 132 can determine amounts of interaction by users of the client application 104 with the interactive elements 508, 510, 512. The AR content metrics analysis system 132 can also determine a number of times that a message is shared that is related to the AR content item 132 in relation to the number of interactions with the interactive elements 508, 510, 512 by users of the client application 104 that shared messages related to the AR content item 134. In various examples, the AR content metrics analysis system 132 can determine that users interacting with the first interactive element 508 are more likely to share messages related to the AR content item 134 than users interacting with the second interactive element 510. In these scenarios, the measure of fitness for use 528 for the first interactive element 508 can be higher than the measure of fitness for use 528 for the second interactive element 510.

In one or more additional illustrative examples, the AR content creator 502 may specify that an outcome of the AR content item 134 corresponds to a number of sales of a product that corresponds to the AR content item 134. The AR content metrics analysis system 132 may determine that interactions with the first interactive element 508 are a better indicator of sales of a product related to the AR content item 134 than interactions with the second interactive element 510 based on the measure of fitness for use 528 of the first interactive element 508 being greater than the measure of fitness for use 528 of the second interactive element 510. In still additional illustrative examples, the AR content metrics analysis system 132 may generate an interactive element recommendation 530 indicating that including the first interactive element 508 in the AR content item 134 is more likely to result in sales of the product than the second interactive element 510 and recommend that the second interactive element 510 is removed from the AR content item 134.

In one or more further examples, the AR content creator 502 may specify that an outcome for the AR content item 134 is a number of purchases of a product displayed in conjunction with the AR content item 134. In these scenarios, the AR content metrics analysis system 132 may determine metrics that may correlate with sales of the product. For example, the metrics that correspond to sales of a product may include at least one of sharing of messages that correspond to the augmented reality content item 134 or a number of times a given user executes the augmented reality content item 134 to modify user content. The AR content metrics analysis system 132 may determine a first level of correlation between the sharing of messages that correspond to the augmented reality content item 134 and sales of a product related to the augmented reality content item 134. The AR content metrics analysis system 132 may also determine a second level of correlation between the number of times that the AR content item 132 is executed in relation to sales of a product related to the augmented reality content item 134. The first level of correlation may be greater than the second level of correlation based on the AR content metrics analysis system 132 determining that users that share messages including user content modified by the AR content item 134 are more likely to purchase the product than users that simply modify user content using the AR content item 134 without sharing the modified user content in a message. In these scenarios, the AR content metrics analysis system 132 may determine that the sharing of messages that include user content modified by the augmented reality content item 132 is an indicator of sales of the product and generate a recommendation for the AR content creator 502 to monitor the number of users of the client application 104 that share messages including user content modified by the AR content item 134 as a predictor for sales of the product related to the AR content item 134.

The AR content metrics analysis system 132 may also determine interactive element recommendations 530 based on the AR content item usage metrics and the measures of fitness for use 528. In various examples, the AR content metrics analysis system 132 may determine interactive elements to include in AR content items in order to increase interactions between users of the client application 104 and AR content items 134. In one or more examples, the AR content metrics analysis system 132 may determine interactive element recommendations 530 to a least one of add, remove, or modify interactive elements of AR content items 134. In one or more illustrative examples, the interactive element recommendations 530 may indicate modifications to one or more of the first interactive element 508, the second interactive element 510, or up to the Nth interactive element 512 to increase interactions between users of the client application 104 and the AR content item 134. Continuing with the previous illustrative example where the measure of fitness for use 528 of the first interactive element 508 is greater than the measure of fitness for use 528 of the second interactive element 510, the AR content metrics analysis system 132 can generate an interactive element recommendation 530 to including the first interactive element 508 in one or more additional AR content items created by the AR content creator 502. In addition, the AR content metrics analysis system 132 can also generate an interactive element recommendation 530 indicating that interaction with the first interactive element 508 is to be tracked with respect to the AR content item 134 rather than interaction with the second interactive element 510 based on the measure of fitness for use 528 of the first interactive element 508 being greater than the measure of fitness for use 528 of the second interactive element 510.

In one or more further examples, the first interactive element 508 can correspond to a first product and the second interactive element 510 may correspond to a second product. In these instances, based on the measure of fitness 528 for the first interactive element 508 being higher than the measure of fitness 528 for the second interactive element 510, the AR content metrics analysis system 132 may generate an interactive element recommendation 530 indicating that the first product has at least a threshold probability of generating a greater number of sales than the second product in relation to users 502 of the client application 104 that interact with the AR content item 134. In still additional examples, the first interactive element 508 can correspond to a first characteristic of a product and the second interactive element 510 may correspond to a second characteristic of a product. To illustrate, the first interactive element 508 may correspond to a first color of a product and the second interactive element 510 may correspond to a second color of a product. Based on the measure of fitness 528 of the first interactive element 508 being greater than the measure of fitness 528 of the second interactive element 510, the AR content metrics analysis metrics system 132 may generate an interactive elements recommendation 530 indicating that users 502 of the client application 104 interacting with the AR content item 134 are more likely to prefer purchasing a version of the product having the first color than a version of the product having the second color.

In various examples, the interactive element recommendations 530 can indicate changing a type of the second interactive element 510 to correspond to a type of the first interactive element 508 based on the measure of fitness for use 528 of the first interactive element 508 being greater than the measure of fitness for use 528 of the second interactive element 510. For example, the first interactive element 508 may be executable to cause an animation to be displayed with respect to user content and the second interactive element 510 may include a photo of an object. In these situations, the AR content metrics analysis system 132 can generate an interactive element recommendation 530 to modify the second interactive element 510 from a photo of the object to an animation that includes the object. In one or more additional examples, the first interactive element 508 may correspond to a first type of product and the second interactive element can correspond to a second type of product. In these scenarios, the AR content metrics analysis system 132 may generate an interactive element recommendation 530 to modify the second interactive element 510 to correspond to the first type of product.

In at least some examples, at least one of the AR content usage system 130 or the AR content metrics analysis system 132 may determine usage metrics for one or more groups of individuals. In one or more examples, the one or more groups may be focus groups that the AR content creator 502 has selected to demonstrate the augmented reality content item 134 or to demonstrate one or more features of the augmented reality content item 134. For example, at least one of the AR content usage system 130 or the AR content metrics analysis system 132 may make the augmented reality content item 134 accessible to a first group of users of the client application 104 having a first number of characteristics. The AR content usage system 130 may determine the first usage metric 514 with respect to the first interactive element 508 based on a number of selections by the first group of users of a first user interface element that corresponds to the first interactive element 508. The AR content usage system 130 may also determine a second usage metric 518 with respect to the second interactive element 510 based on a number of selections by the first group of users of a second user interface element that corresponds to the second interactive element 510. After monitoring usage of the first interactive element 508 and the second interactive element 510 by the first group of users, at least one of the AR content usage system 130 or the AR content metrics analysis system 132 may identify a second group of users of the client application 104 to monitor usage with respect to the first interactive element 508 and the second interactive element 510. To illustrate, the AR content usage system 130 may determine a first number of selections by the second group of users of the first user interface element that corresponds to the first interactive element 508 and a second number of selections by the second group of users of the second user interface element that corresponds to the second interactive element 510. In this way, at least one of the AR content usage system 130 or the AR content metrics analysis system 132 may analyze interactions with the first interactive element 508 and the second interactive element 510 by the first group of users and the second group of users to determine which group of users is more likely to interact with the first interactive element 508 or the second interactive element 510. The AR content metrics analysis system 132 may then analyze characteristics of the first group of users or the second group of users to determine characteristic of users of the client application 104 that are more likely to interact with the first interactive element 508 or the second interactive element 510. In this way, the AR content metrics analysis system 132 may identify a potential target audience for at least one of the first interactive element

508 or the second interactive element 510 using focus groups that are smaller than the actual target audience.

Figure 6:
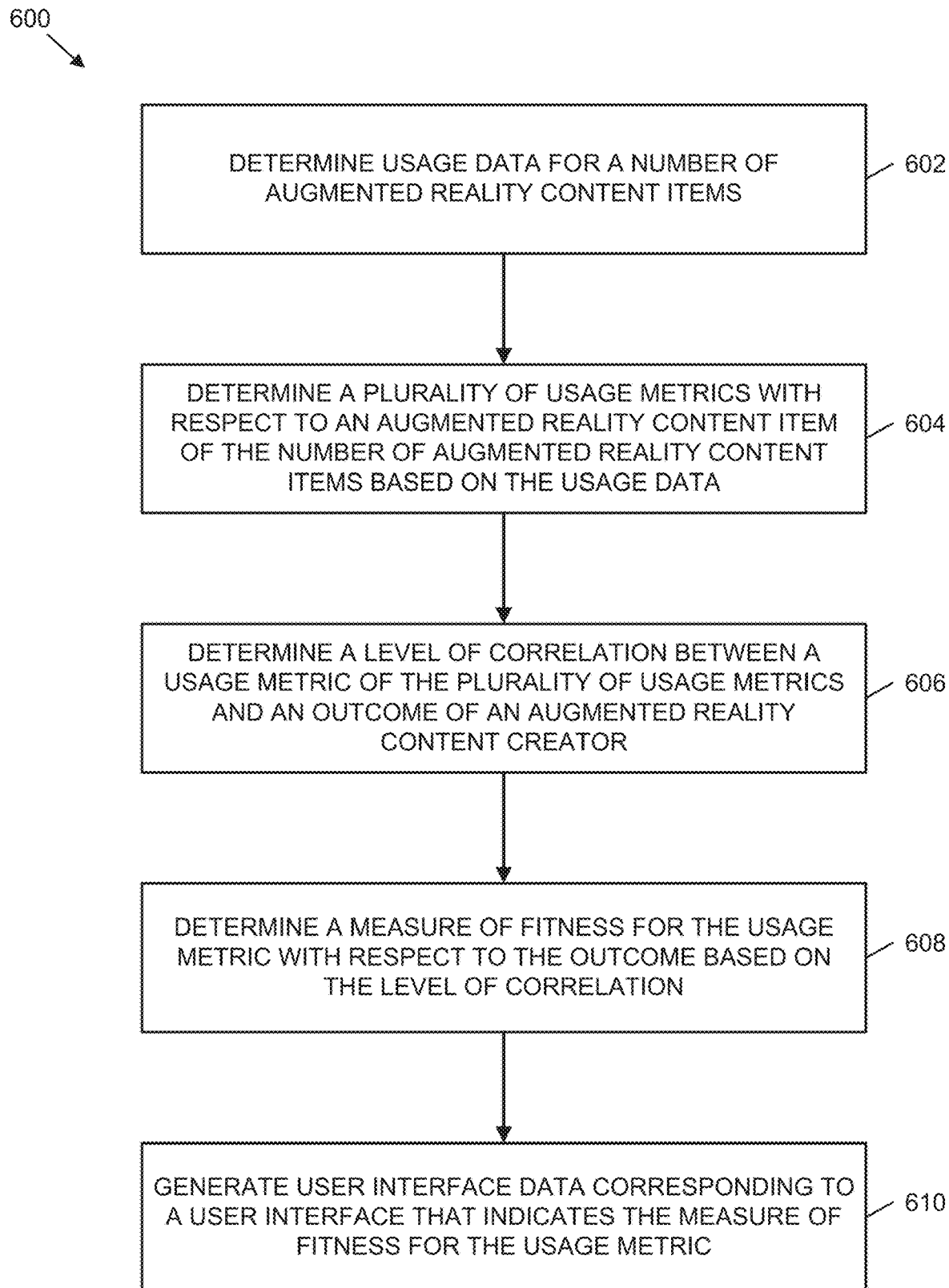
FIG. 6 is a flowchart illustrating example operations of a process to determine measures of fitness of usage metrics of augmented reality content items with respect to outcomes specified by augmented reality content creators, according to one or more example implementations.

FIG. 6 illustrates a flowchart of one or more implementations of a process to analyze augmented reality content usage data. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIG. 6 may be deployed on various other hardware configurations. The processes described with respect to FIG. 6 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to determine measures of fitness of usage metrics of augmented reality content items with respect to outcomes specified by augmented reality content creators, according to one or more example implementations. The process 600 may include, at operation 602, determining usage data for a number of augmented reality content items. The usage data may indicate an amount of interaction between users of the client application and the number of augmented reality content items. Interaction with augmented reality content items may include executing the augmented reality content item to modify user content. In addition, interaction with the augmented reality content item may include selection of a user interface element that is displayed in response to execution of the augmented reality content item. Further, determining an amount of interaction with the augmented reality content item may include determining a number of messages sent via the client application that correspond to user content modified by the augmented reality content item. In one or more additional examples, determining an amount of interaction with the augmented reality content item may include determining a number of times that the augmented reality content item has been shared by the users of the client application. In various examples, determining an amount of interaction with the augmented reality content item may include determining a number of times that the augmented reality content item has been executed to modify one or more items of user content.

At operation 604, the process 600 may include determining a plurality of usage metrics with respect to an augmented reality content item of the number of augmented reality content items based on the usage data. The plurality of usage metrics may correspond to various ways to represent interactions between users of the client application and augmented reality content items. In one or more examples, the usage metrics may indicate a number of times that the augmented reality content is added to an account of an individual with a messaging system and/or social networking system. The usage metrics may also indicate a number of times that the augmented reality content item is executed to modify user content. Additionally, the usage metrics may indicate a number of selections of one or more user interface elements related to the augmented reality content item.

In various examples, individual augmented reality content items may include a plurality of user interface elements. For example, an augmented reality content item may include a first user interface element that corresponds to one or more first visual effects that are displayed in conjunction with user content and a second user interface element that corresponds to one or more second visual effects that are displayed in conjunction with the user content that are different from the one or more first visual effects. Additionally, the augmented reality content item may include a third user interface element corresponds to one or more third visual effects that are displayed in conjunction with the user content that are different from the one or more first visual effects and the one or more second visual effects. In one or more illustrative examples, the one or more first visual effects correspond to a first product having a first number of features, the one or more second visual effects correspond to a second product having a second number of features, and the one or more third visual effects correspond to a third product having a third number of features. In these scenarios, selection of the first user interface element may cause the one or more first visual effects related to the first product to be displayed with respect to the user content and selection of the second user interface element may cause the one or more second visual effects related to the second product to be displayed with respect to the user content. Further, selection of the third user interface element may cause the one or more third visual effects related to the third product to be displayed with respect to the user content.

In addition, at operation 606, the process 600 may include determining a level of correlation between a usage metric of the plurality of usage metrics and an outcome of an augmented reality content creator. In various examples, a first amount of change of the usage metric may be determined over a period of time for the augmented reality content item. Additionally, a second amount of change of the outcome may be determined for the period of time. In one or more examples, the level of correlation may be determined based on the first amount of change in relation to the second amount of change. In at least some scenarios, a level of correlation between the usage metric and the outcome may increase based on an amount of similarity in a rate of change of the usage metric and a rate of change of the outcome.

In one or more implementations, the level of correlation between the usage metric and the outcome may be determined by identifying a number of times that one or more actions corresponding to the usage metric occur in relation to the outcome. For example, the usage metric may correspond to a number of times that the augmented reality content item is used to modify user content and the modified user content is included in a message provided to additional users. Further, the outcome may correspond to a number of times that a product related to the augmented reality content item is purchased by a user of the system. In these scenarios, the level of correlation may be determined based on a number of times that users of the system purchased the product after receiving a message that includes user content modified by the augmented reality content item. In one or more illustrative examples, the product may be a clothing item and the augmented reality content item may modify the user content by displaying an individual included in the user content wearing the clothing item. In these situations, the level of correlation may be determined based on a number of times that users purchased the clothing item after viewing a message that includes modified user content showing individuals wearing the clothing item. As the number of times that the clothing item is purchased increase, the level of correlation may also increase. In one or more additional examples, the outcome may correspond to a number of times that the augmented reality content item is purchased by one or more users of the client application. In one or more further examples, a preview of a portion of the augmented reality content item may be displayed and a user interface element may also be displayed that is selectable to cause a remainder of the augmented reality content item to be displayed or executed. In these scenarios, the outcome may correspond to selection of the user interface element that causes the remainder of the augmented reality content item to be displayed or executed.

The process 600 may also include, at operation 608, determining a measure of fitness for the usage metric with respect to the outcome based on the level of correlation. The measure of fitness may be one of a plurality of measures of fitness that correspond to a number of usage metrics with respect to the outcome. Each measure of fitness for the individual usage metrics may be displayed in the user interface. In one or more examples, an additional level of correlation may be determined between an additional usage metric of the plurality of usage metrics and the outcome specified by the augmented reality content creator. The additional level of correlation may be used to determine an additional measure of fitness for the additional usage metric with respect to the outcome. In various examples, levels of fitness for multiple outcomes may also be displayed in the user interface. To illustrate, an additional level of correlation may be determined that corresponds to the usage metric of the plurality of usage metrics and an additional outcome specified by the augmented reality content creator. Based on the additional level of correlation between the usage metric and the additional outcome, an additional measure of fitness for the usage metric with respect to the additional outcome may be determined.

Further, at operation 610, the process 600 may include generating user interface data corresponding to a user interface that indicates the measure of fitness for the usage metric. In one or more examples, additional user input may be received to view at least one usage metric of the one or more usage metrics corresponding to the augmented reality content item. In various examples, the user interface data may be generated in response to the additional user input and the one or more user interfaces include the at least one usage metric. In addition, additional user interface data may be generated that corresponds to one or more additional user interfaces that are displayed as part of a tool to build augmented reality content items. The one or more additional user interfaces may include at least one user interface that enables selection of one or more features of an augmented reality content item and selection of the one or more features of the augmented reality content item using the tool causes an indication to be stored in a data structure that stores data related to the augmented reality content item. The indication may indicate that selection of a user interface element that is associated with a feature of the one or more features corresponds to an interaction with the augmented reality content item.

In one or more examples, an analysis can be performed with respect to the usage data in relation to a number of user interface elements included in the number of augmented reality content items. Additionally, based on the analysis, a user interface element of the number of user interface elements may be determined that has at least a threshold probability of increasing the usage metric with respect to the outcome. The user interface element may be selectable to cause one or more actions to be performed that modify user content as part of the augmented reality content item. In various examples, the threshold probability of increasing the usage metric with respect to the outcome may correspond to one or more frequencies of selection of the user interface element. The threshold probability of increasing the measure of fitness for the usage metric may also correspond to a number of times that a user interface element has been selected. In one or more illustrative examples, the usage metrics with respect to a number of user interface elements may be analyzed for one or more augmented reality content items and one or more statistical techniques and/or one or more machine learning techniques may be applied to determine rankings for the number of user interface elements. As the ranking increases, the probability of a user interface element causing an increase in usage of an augmented reality content item may also increase. In one or more implementations, the threshold probability of increasing the measure of fitness for the usage metric may relate to a respective minimum ranking of a user interface element of the number of user interface elements. A recommendation may be made accessible to the augmented reality content creator that indicates including the user interface element as part of the augmented reality content item. In various examples, the augmented reality content item may be modified to display the user interface element in response to the augmented reality content item being executed. The user interface element may cause actions to be performed that are different from actions performed by one or more additional user interface elements that are already part of the augmented reality content item.

In one or more additional examples, an analysis can be performed that indicates features of augmented reality content items that result in an increase of usage of augmented reality content items. The features of the augmented reality content item may include a graphic, an animation, a modification to a shape of one or more objects included in user content, a modification to a color of one or more objects included in user content, a color scheme of one or more objects displayed in relation to the augmented reality content item, a quality of image and/or video content displayed in conjunction with the augmented reality content item, or one or more combinations thereof. In various examples, the usage metrics with respect to a number of features of augmented reality content items may be analyzed using statistical techniques and/or one or more machine learning techniques to determine at least one of frequency of use of the feature and/or a number of times the feature is used. In one or more examples, a feature of an augmented reality content item may be determined to increase usage of an augmented reality content item based on a frequency of use of the feature being at least a threshold amount greater than at least a portion of other features of augmented reality content items.

One or more additional analyses may be performed with respect to a fitness for use of a usage metric to indicate the outcome. The usage metric may correspond to adding an augmented reality content item to an account of a user, sharing the augmented reality content item with additional users, modifying user content using the augmented reality content item to modify user content, generating a message that includes user content modified by the augmented reality content item, an amount of time spent with the augmented reality content item, or one or more combinations thereof. The one or more analyses may include determining at least one of a frequency or a number of times that a usage metric corresponds to the outcome. As at least one of the number of times or frequency increases with respect to the usage metric corresponding to the outcome, the fitness for use of the usage metric to indicate the outcome may also increase.

In at least some implementations, an augmented reality content item may be made accessible to a group of users of a client application to test user interface elements to determine user interface elements that may be used more frequently than other user interface elements. The usage data related to the user interface elements may indicate one or more user interface elements that may increase a measure of fitness of the user interface element to achieve an outcome specified by an augmented reality content item creator. The augmented reality content item having a plurality of user interface elements may have a plurality of user interface elements that are individually selectable to cause one or more respective actions to be performed with respect to user content captured using the client application. In one or more examples, a first usage metric may be determined with respect to a first user interface element of the plurality of user interface elements based on a first number of selections of the first user interface element by the group of users of the client application. Additionally, a second usage metric may be determined with respect to a second user interface element of the plurality of user interface elements based on a second number of selections of the second user interface element by the group of users of the client application. A first measure of fitness for the first usage metric may be based on a first correlation between the first usage metric and the outcome and a second measure of fitness may be determined for the second usage metric based on a second correlation between the second usage metric and the outcome. In one or more illustrative examples, the first usage metric has a greater level of correlation with the outcome than the second usage metric based on the first usage metric being greater than the second usage metric. In one or more additional examples, the augmented reality content item may be made accessible to an additional group of users of the client application and additional usage metrics for the user interface elements of the augmented reality content may be determined to identify one or more characteristics of users of the client application that may be more likely to select the user interface element in relation to users of the client application that do not have the one or more characteristics.

In one or more further examples, a target audience may be determined based on usage data of user interface elements. To illustrate, profile information may be determined that corresponds to a number of users of the client application that interacted with the augmented reality content item. In addition, a user characterization for the augmented reality content item may be determined by identifying characteristics of the number of users of the client application that interacted with the augmented reality content item. The characteristics may be used to determine a target audience for the augmented reality content item. In various examples, determining whether an individual is included in a target audience may include analyzing first characteristics of a user of the client application and second characteristics of a target audience for the augmented reality content item and determining that an amount of similarity between the first characteristics and the second characteristics is at least a threshold amount of similarity. In response to determining that a user is included in a target audience related to the augmented reality content, a recommendation may be sent to a client device of the user of the client application indicating the augmented reality content item.

Figure 7:
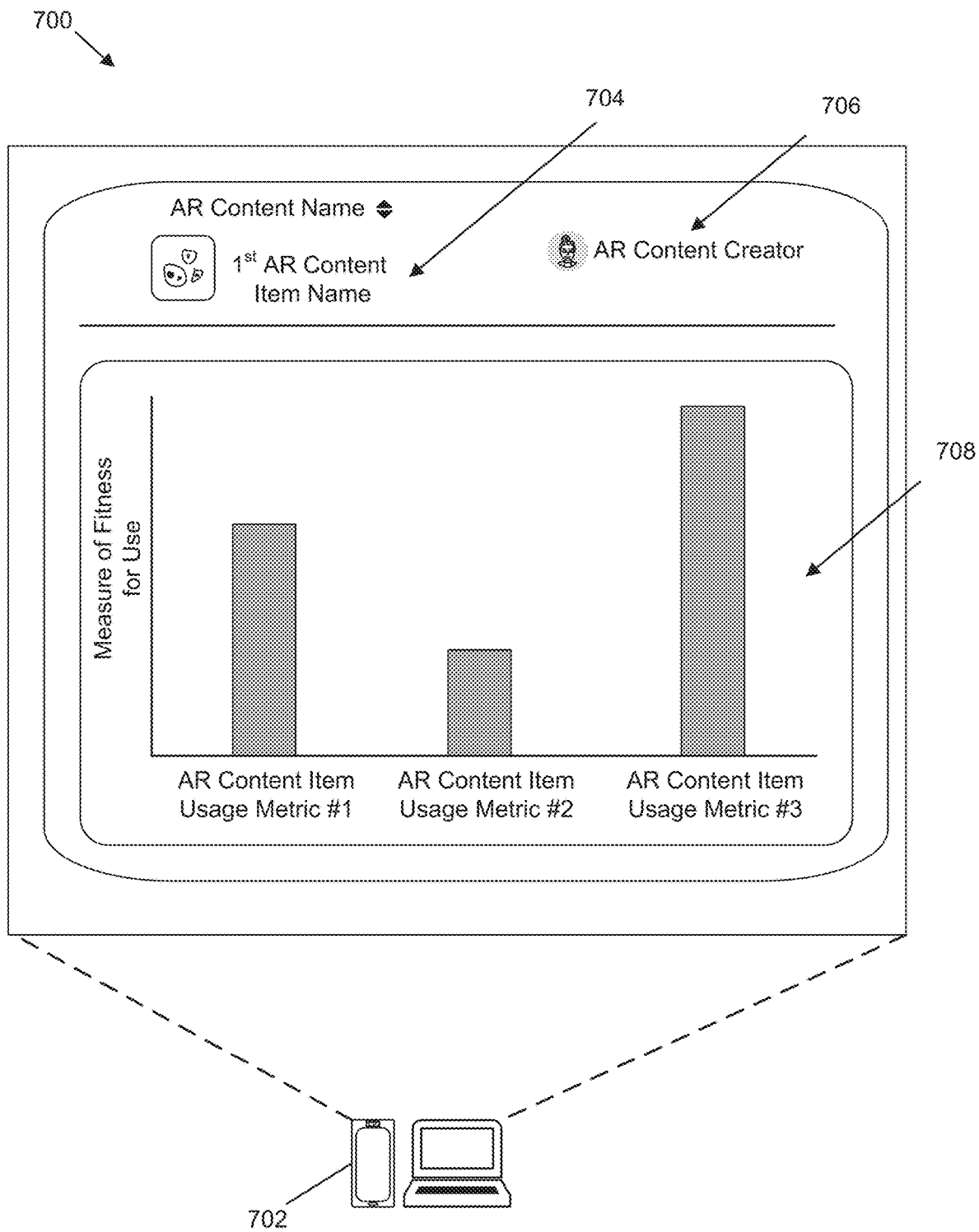
FIG. 7 is an illustration of a user interface that indicates information about measures of fitness for use of a number of augmented reality content item usage metrics, according to one or more example implementations.

FIG. 7 is an illustration of a user interface 700 that indicates information about measures of fitness for use of a number of augmented reality content item usage metrics, according to one or more example implementations. The user interface 700 may be generated by a computing device 702 and displayed via a display device of the computing device 702. The computing device 702 may be operated by a representative of an augmented reality content creator. The user interface 700 may include a first region 704 that indicates the name of the augmented reality content creator.

The user interface 700 may also include a region 706 that indicates an identifier of an augmented reality content item created by the augmented reality content creator specified in region 704. In one or more examples, the identifier of the augmented reality content item may be selected from among a list of augmented reality content items created by the augmented reality content item creator. Further, the user interface 700 may include a region 708 that indicates measures of fitness for use with respect to a number of AR content item usage metrics. The measures of fitness for use may be related to an outcome indicated by the augmented reality content item creator with respect to the AR content item usage metrics.

Figure 8:
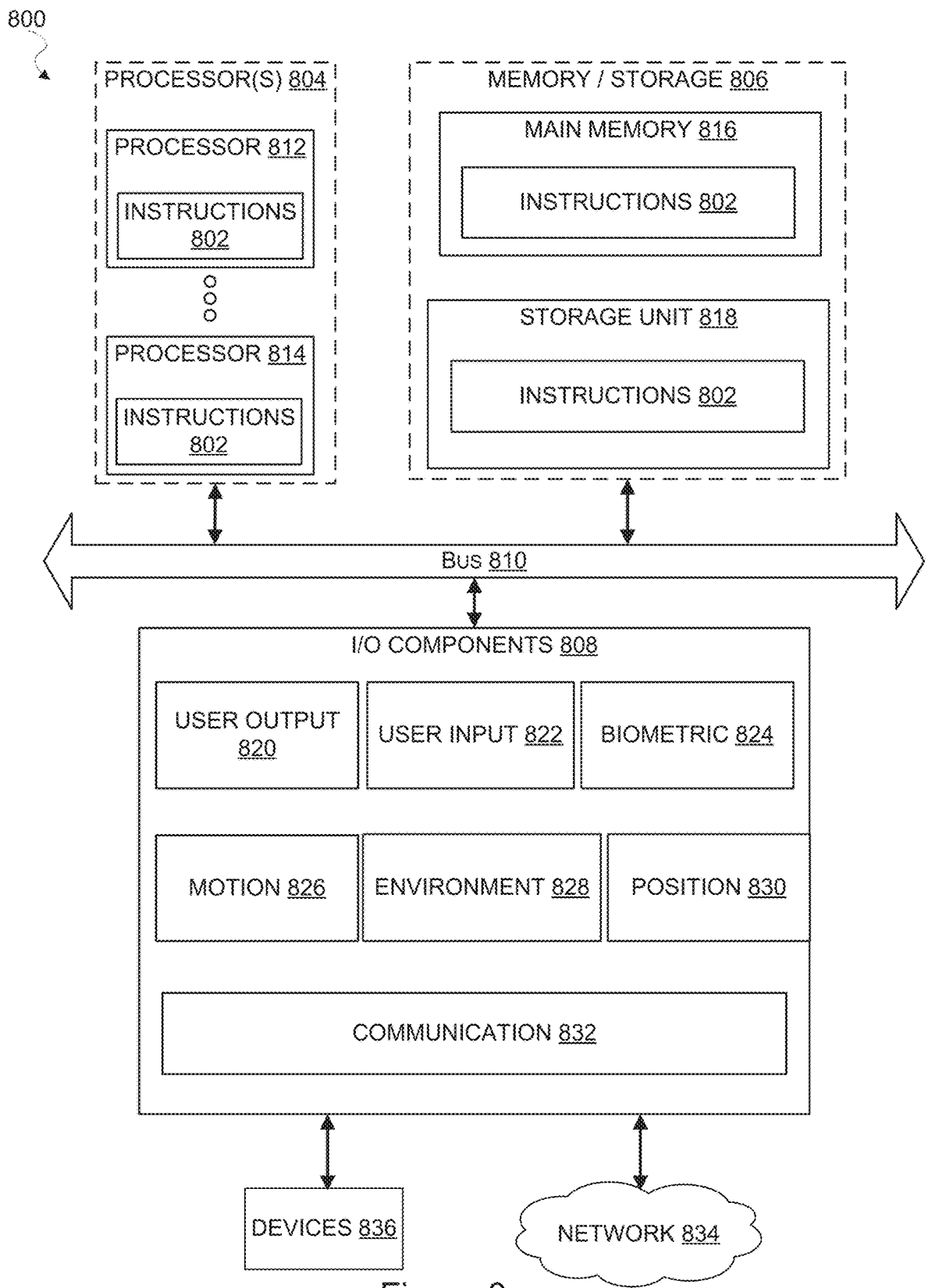
FIG. 8 is a block diagram illustrating components of a machine, in the form of a computer system, that may read and execute instructions from one or more machine-readable media to perform any one or more methodologies described herein, in accordance with one or more example implementations.

FIG. 8 is a block diagram illustrating components of a machine 800, according to some example implementations, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 802 (e.g., software, a program, an application, an applet, an app, or other executable code) for causing the machine 800 to perform any one or more of the methodologies discussed herein may be executed. As such, the instructions 802 may be used to implement modules or components described herein. The instructions 802 transform the general, non-programmed machine 800 into a particular machine 800 programmed to carry out the described and illustrated functions in the manner described. In alternative implementations, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 802, sequentially or otherwise, that specify actions to be taken by machine 800. Further, while only a single machine 800 is illustrated, the term "machine" shall also be taken to include a collection of machines that individually or jointly execute the instructions 802 to perform any one or more of the methodologies discussed herein.

The machine 800 may include processors 804, memory/storage 806, and I/O components 808, which may be configured to communicate with each other such as via a bus 810. In an example implementation, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 802. The term "processor" is intended to include multi-core processors 804 that may comprise two or more independent processors (sometimes referred to as "cores") that may execute instructions 802 contemporaneously. Although FIG. 8 shows multiple processors 804, the machine 800 may include a single processor 812 with a single core, a single processor 812 with multiple cores (e.g., a multi-core processor), multiple processors 812, 814 with a single core, multiple processors 812, 814 with multiple cores, or any combination thereof.

The memory/storage 806 may include memory, such as a main memory 816, or other memory storage, and a storage unit 818, both accessible to the processors 804 such as via the bus 810. The storage unit 818 and main memory 816 store the instructions 802 embodying any one or more of the methodologies or functions described herein. The instructions 802 may also reside, completely or partially, within the main memory 816, within the storage unit 818, within at least one of the processors 804 (e.g., within the processor's cache memory), or any suitable combination thereof, during execution thereof by the machine 800. Accordingly, the main memory 816, the storage unit 818, and the memory of processors 804 are examples of machine-readable media.

The I/O components 808 may include a wide variety of components to receive input, provide output, produce output, transmit information, exchange information, capture measurements, and so on. The specific I/O components 808 that are included in a particular machine 800 will depend on the type of machine. For example, portable machines such as mobile phones will likely include a touch input device or other such input mechanisms, while a headless server machine will likely not include such a touch input device. It will be appreciated that the I/O components 808 may include many other components that are not shown in FIG. 10. The I/O components 808 are grouped according to functionality merely for simplifying the following discussion and the grouping is in no way limiting. In various example implementations, the I/O components 808 may include user output components 820 and user input components 822. The user output components 820 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 822 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 808 may include biometric components 824, motion components 826, environmental components 828, or position components 830 among a wide array of other components. For example, the biometric components 824 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 826 may include acceleration sensor components (e.g., accelerometer), gravitation sensor components, rotation sensor components (e.g., gyroscope), and so forth. The environmental components 828 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 830 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 may include communication components 832 operable to couple the machine 800 to a network 834 or devices 836. For example, the communication components 832 may include a network interface component or other suitable device to interface with the network 834. In further examples, communication components 832 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 836 may be another machine 800 or any of a wide variety of peripheral devices (e.g., a peripheral device coupled via a USB).

Moreover, the communication components 832 may detect identifiers or include components operable to detect identifiers. For example, the communication components 832 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 832, such as location via Internet Protocol (IP) geo-location, location via Wi-Fi® signal triangulation, location via detecting an NFC beacon signal that may indicate a particular location, and so forth.

Figure 9:
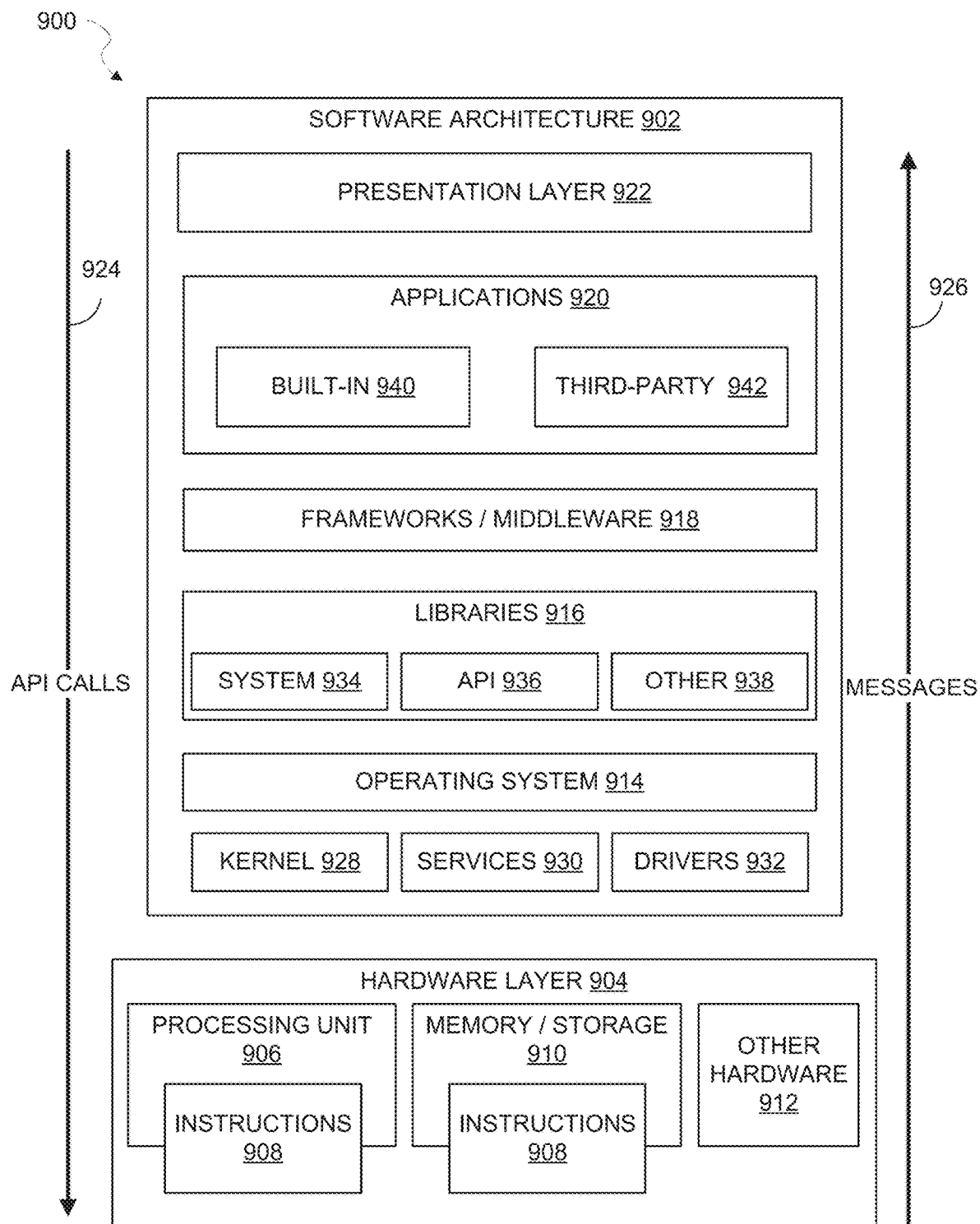
FIG. 9 is block diagram illustrating a representative software architecture that may be used in conjunction with one or more hardware architectures described herein, in accordance with one or more example implementations.

FIG. 9 is a block diagram illustrating system 900 that includes an example software architecture 902, which may be used in conjunction with various hardware architectures herein described. FIG. 9 is a non-limiting example of a software architecture and it will be appreciated that many other architectures may be implemented to facilitate the functionality described herein. The software architecture 902 may execute on hardware such as machine 800 of FIG. 8 that includes, among other things, processors 804, memory/storage 806, and input/output (I/O) components 808. A representative hardware layer 904 is illustrated and can represent, for example, the machine 800 of FIG. 8. The representative hardware layer 904 includes a processing unit 906 having associated executable instructions 908. Executable instructions 908 represent the executable instructions of the software architecture 902, including implementation of the methods, components, and so forth described herein. The hardware layer 904 also includes at least one of memory or storage modules memory/storage 910, which also have executable instructions 908. The hardware layer 904 may also comprise other hardware 912.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 922. Operationally, the applications 920 or other components within the layers may invoke API calls 924 through the software stack and receive messages 926 in response to the API calls 924. The layers illustrated are representative in nature and not all software architectures have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 are responsible for controlling or interfacing with the underlying hardware. For instance, the drivers 932 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 provide a common infrastructure that is used by at least one of the applications 920, other components, or layers. The libraries 916 provide functionality that allows other software components to perform tasks in an easier fashion than to interface directly with the underlying operating system 914 functionality (e.g., kernel 928, services 930, drivers 932). The libraries 916 may include system libraries 934 (e.g., C standard library) that may provide functions such as memory allocation functions, string manipulation functions, mathematical functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 (also sometimes referred to as middleware) provide a higher-level common infrastructure that may be used by the applications 920 or other software components/modules. For example, the frameworks/middleware 918 may provide various graphical user interface functions, high-level resource management, high-level location services, and so forth. The frameworks/middleware 918 may provide a broad spectrum of other APIs that may be utilized by the applications 920 or other software components/modules, some of which may be specific to a particular operating system 914 or platform.

The applications 920 include built-in applications 940 and third-party applications 942. Examples of representative built-in applications 940 may include, but are not limited to, a contacts application, a browser application, a book reader application, a location application, a media application, a messaging application, or a game application. Third-party applications 942 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 942 may invoke the API calls 924 provided by the mobile operating system (such as operating system 914) to facilitate functionality described herein.

The applications 920 may use built-in operating system functions (e.g., kernel 928, services 930, drivers 932), libraries 916, and frameworks/middleware 918 to create UIs to interact with users of the system. Alternatively, or additionally, in some systems, interactions with a user may occur through a presentation layer, such as presentation layer 922. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 802 for execution by the machine 800, and includes digital or analog communications signals or other intangible medium to facilitate communication of such instructions 802. Instructions 802 may be transmitted or received over the network 110, 834 using a transitory or non-transitory transmission medium via a network interface device and using any one of a number of well-known transfer protocols.

"CLIENT DEVICE," in this context, refers to any machine 800 that interfaces to a communications network 110, 834 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 834.

"COMMUNICATIONS NETWORK," in this context, refers to one or more portions of a network 110, 834 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 834 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 802 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 802. The term "machine-readable medium" shall also be taken to include any medium, or combination of multiple media, that is capable of storing instructions 802 (e.g., code) for execution by a machine 800, such that the instructions 802, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 804 or other programmable processor. Once configured by such software, hardware components become specific machines (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor 812, 814 or processors 804, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor 812, 814 or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 110 (e.g., the Internet) and via one or more appropriate interfaces (e.g., an API). The performance of certain of the operations may be distributed among the processors, not only residing within a single machine 800, but deployed across a number of machines. In some example implementations, the processors 804 or processor-implemented components may be located in a single geographic location (e.g., within a home environment, an office environment, or a server farm). In other example implementations, the processors 804 or processor-implemented components may be distributed across a number of geographic locations.

"PROCESSOR," in this context, refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may, for example, be a CPU, a RISC processor, a CISC processor, a GPU, a DSP, an ASIC, a RFIC or any combination thereof. A processor 804 may further be a multi-core processor having two or more independent processors 804 (sometimes referred to as "cores") that may execute instructions 802 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
determining, by one or more computing devices that each include a processor and memory, usage data indicating an amount of interaction by users of a client application with respect to an augmented reality content item;
performing, by at least one computing device of the one or more computing devices, an analysis of the usage data with respect to one or more user interface elements of the augmented reality content item;
determining, by at least one computing device of the one or more computing devices and based on the analysis, a user interface element of the one or more user interface elements having at least a threshold probability of increasing usage of the augmented reality content item;
causing, by at least one computing device of the one or more computing devices, a recommendation to be accessible to an augmented reality content creator that indicates the user interface element; and
causing, by at least one computing device of the one or more computing devices, a user interface of a dashboard of the augmented reality content creator to be displayed, the user interface including one or more usage metrics with respect to the user interface element.

2. The method of claim 1, comprising:
determining, by one or more computing devices that each include a processor and memory, usage data for a number of augmented reality content items, the usage data indicating an amount of interaction by users of a client application with respect to individual augmented reality content items of the number of augmented reality content items; and
determining, by at least one computing device of the one or more computing devices, a plurality of usage metrics with respect to an augmented reality content item of the number of augmented reality content items based on the usage data, the one or more usage metrics being included in the plurality of usage metrics and the augmented reality content item being produced by the augmented reality content creator.

3. The method of claim 2, further comprising:
determining, by one or more computing devices that each include a processor and memory, a level of correlation between a usage metric related to an augmented reality content item and an outcome corresponding to usage of the augmented reality content item, the usage metric indicating an amount of interaction by users with the augmented reality content item and the augmented reality content item being produced by an augmented reality content creator;
determining, by at least one computing device of the one or more computing devices and based on the level of correlation, a measure of fitness for the usage metric with respect to the outcome; and
generating, by at least one computing device of the one or more computing devices, user interface data corresponding to an additional user interface that indicates the measure of fitness for the usage metric.

4. The method of claim 3, further comprising:
determining, by at least one computing device of the one or more computing devices, an additional level of correlation between an additional usage metric of the plurality of usage metrics and the outcome specified by the augmented reality content creator; and
determining, by at least one computing device of the one or more computing devices and based on the additional level of correlation, an additional measure of fitness for the additional usage metric with respect to the outcome;

wherein the additional user interface indicates the additional measure of fitness for the additional usage metric.

5. The method of claim 3, further comprising:
determining, by at least one computing device of the one or more computing devices, an additional level of correlation between the usage metric of the plurality of usage metrics and an additional outcome specified by the augmented reality content creator; and
determining, by at least one computing device of the one or more computing devices and based on the additional level of correlation, an additional measure of fitness for the usage metric with respect to the additional outcome.

6. The method of claim 1, further comprising:
determining, by at least one computing device of the one or more computing devices, profile information corresponding to a plurality of users of the client application that interacted with the augmented reality content item;
determining, by at least one computing device of the one or more computing devices, a user characterization for the augmented reality content item based on characteristics of the plurality of users of the client application that interacted with the augmented reality content item; and
generating, by at least one computing device of the one or more computing devices, user interface data that corresponds to one or more user interfaces that indicate a target audience for the augmented reality content item having at least a portion of the user characterization.

7. The method of claim 1, wherein:
a first usage metric related to the augmented reality content item includes a number of messages sent via the client application that correspond to user content modified by the augmented reality content item;
a second usage metric related to the augmented reality content item includes a number of times that the augmented reality content item has been shared by the users of the client application; and
a third usage metric related to the augmented reality content item includes an additional number of times that the augmented reality content item has been executed to modify one or more items of user content.

8. The method of claim 7, comprising:
determining, by at least one computing device of the one or more computing devices, a first measure of fitness with respect to the first usage metric based on a first number of users of the client application that purchased a product related to the augmented reality content item after receiving a message sent via the client application that included user content modified by the augmented reality content item;
determining, by at least one computing device of the one or more computing devices, a second measure of fitness with respect to the second usage metric based on a second number of users of the client application that purchased the product after respective additional users of the client application shared the augmented reality content item with the second number of users; and
determining, by at least one computing device of the one or more computing devices, a third measure of fitness with respect to the third usage metric based on a third number of users of the client application that purchased the product after modifying user content using the augmented reality content item.

9. A system comprising:
one or more hardware processors; and
one or more non-transitory computer-readable storage media including computer-readable instructions that, when executed by the one or more hardware processors, cause the one or more hardware processors to perform operations comprising:
determining usage data indicating an amount of interaction by users of a client application with respect to an augmented reality content item;
performing an analysis of the usage data with respect to one or more user interface elements of the augmented reality content item;
determining, based on the analysis, a user interface element of the one or more user interface elements having at least a threshold probability of increasing usage of the augmented reality content item;
causing a recommendation to be accessible to an augmented reality content creator that indicates the user interface element; and
causing a user interface of a dashboard of the augmented reality content creator to be displayed, the user interface including one or more usage metrics with respect to the user interface element.

10. The system of claim 9, wherein:
the one or more non-transitory computer-readable storage media include additional computer-readable instructions that, when executed by the one or more hardware processors, cause the one or more hardware processors to perform additional operations comprising:
determining a level of correlation between a usage metric related to the augmented reality content item and an outcome corresponding to usage of the augmented reality content item, the usage metric indicating an amount of interaction by a plurality of users with the augmented reality content item and the augmented reality content item being produced by an augmented reality content creator;
determining, based on the level of correlation, a measure of fitness for the usage metric with respect to the outcome; and
generating user interface data corresponding to at least one user interface that indicates the measure of fitness for the usage metric.

11. The system of claim 10, wherein:
the one or more non-transitory computer-readable storage media include additional computer-readable instructions that, when executed by the one or more hardware processors, cause the one or more hardware processors to perform additional operations comprising:
determining a first amount of change of the usage metric over a period of time for the augmented reality content item; and
determining a second amount of change of the outcome of the period of time; and
the level of correlation is determined based on the first amount of change in relation to the second amount of change.

12. The system of claim 9, wherein performing the analysis of the usage data with respect to one or more user interface elements of the augmented reality content item includes:
determining a first usage metric with respect to a first user interface element of the augmented reality content item based on a first number of selections of the first user interface element by the users of the client application; and
determining a second usage metric with respect to a second user interface element of the augmented reality content item based on a second number of selections of the second user interface element by the users of the client application.

13. The system of claim 12, wherein the one or more non-transitory computer-readable storage media include additional computer-readable instructions that, when executed by the one or more hardware processors, cause the one or more hardware processors to perform additional operations comprising:
   making the augmented reality content item accessible to an additional group of users of the client application, the additional group of users having one or more characteristics that are different from an initial group of users;
   determining a first additional usage metric with respect to the first user interface element based on a first additional number of selections of the first user interface element by the additional group of users of the client application; and
   determining a second additional usage metric with respect to the second user interface element based on a second additional number of selections of the second user interface element by the additional group of users of the client application.

14. The system of claim 10, wherein the one or more non-transitory computer-readable storage media include additional computer-readable instructions that, when executed by the one or more hardware processors, cause the one or more hardware processors to perform additional operations comprising:
   determining a first measure of fitness for a first usage metric based on a first correlation between the first usage metric and the outcome;
   determining a second measure of fitness for a second usage metric based on a second correlation between the second usage metric and the outcome; and
   determining that the first usage metric has a greater level of correlation with the outcome than the second usage metric based on the first usage metric being greater than the second usage metric.

15. The system of claim 14, wherein the one or more non-transitory computer-readable storage media include additional computer-readable instructions that, when executed by the one or more hardware processors, cause the one or more hardware processors to perform additional operations comprising:
   generating an additional recommendation for the augmented reality content creator with respect to the first usage metric; and
   receiving input from the augmented reality content creator to monitor the first usage metric.

16. The system of claim 15, wherein:
   the first usage metric corresponds to at least one of an interaction with the augmented reality content item or an action performed by the users of the client application related to the augmented reality content item;
   the one or more non-transitory computer-readable storage media include additional computer-readable instructions that, when executed by the one or more hardware processors, cause the one or more hardware processors to perform additional operations comprising:
   monitoring the first usage metric over a period of time by determining instances of at least one of the interaction or the action; and
   generating additional user interface data corresponding to an additional user interface that indicates the first usage metric.

17. The system of claim 10, wherein the one or more non-transitory computer-readable storage media include additional computer-readable instructions that, when executed by the one or more hardware processors, cause the one or more hardware processors to perform additional operations comprising:
   generating additional user interface data corresponding to an additional user interface that includes a plurality of selectable options, individual selectable options of the plurality of selectable options corresponding to an individual usage metric;
   receiving input from the augmented reality content creator indicating selection of one or more selectable options of the plurality of selectable options; and
   generating further user interface data corresponding to a further user interface that indicates one or more individual usage metrics that correspond to the one or more selectable options.

18. One or more non-transitory computer-readable media comprising computer-readable instructions, which when executed by a computing device, cause the computing device to perform operations comprising:
   determining usage data indicating an amount of interaction by users of a client application with respect to an augmented reality content item;
   performing an analysis of the usage data with respect to one or more user interface elements of the augmented reality content item;
   determining, based on the analysis, a user interface element of the one or more user interface elements having at least a threshold probability of increasing usage of the augmented reality content item;
   causing a recommendation to be accessible to an augmented reality content creator that indicates the user interface element; and
   causing a user interface of a dashboard of the augmented reality content creator to be displayed, the user interface including one or more usage metrics with respect to the user interface element.

19. The one or more non-transitory computer-readable media of claim 18, further comprising additional computer-readable instructions, which when executed by a computing device, cause the computing device to perform additional operations comprising:
   generating user interface data that corresponds to one or more user interfaces that are displayed as part of a tool to build augmented reality content items, the one or more user interfaces including at least one user interface that enables selection of one or more features of an augmented reality content item and selection of the one or more features of the augmented reality content item using the tool causes an indication to be stored in a data structure that stores data related to the augmented reality content item, wherein the indication indicates that selection of one or more user interface elements corresponds to an interaction with the augmented reality content item.

20. The one or more non-transitory computer-readable media of claim 18, further comprising additional computer-readable instructions, which when executed by a computing device, cause the computing device to perform additional operations comprising:
   analyzing first characteristics of a user of a client application and second characteristics of a target audience for the augmented reality content item;
   determining that the user of the client application is included in the target audience based on determining that an amount of similarity between the first characteristics and the second characteristics is at least a threshold amount of similarity; and sending an additional recommendation to a client device of the user of the client application indicating the augmented reality content item.

* * * * *